(12) United States Patent
Diab et al.

(10) Patent No.: US 8,589,507 B2
(45) Date of Patent: *Nov. 19, 2013

(54) METHOD AND SYSTEM FOR KEYBOARD, SOUND AND MOUSE (KSM) OVER LAN A/V BRIDGING AND A/V BRIDGING EXTENSIONS FOR GRAPHICS THIN CLIENT APPLICATIONS

(75) Inventors: Wael William Diab, San Francisco, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 1200 days.

This patent is subject to a terminal disclaimer.

(21) Appl. No.: 11/966,274

(22) Filed: Dec. 28, 2007

(65) Prior Publication Data

US 2008/0284621 A1 Nov. 20, 2008

Related U.S. Application Data

(60) Provisional application No. 60/917,870, filed on May 14, 2007.

(51) Int. Cl.
*G06F 15/16* (2006.01)

(52) U.S. Cl.
USPC ............................ 709/217; 370/465; 370/474

(58) Field of Classification Search
USPC ........... 370/254, 256, 408, 401; 709/231, 226
See application file for complete search history.

(56) References Cited

U.S. PATENT DOCUMENTS

| | | | |
|---|---|---|---|
| 5,909,564 A | 6/1999 | Alexander et al. | |
| 6,650,640 B1 | 11/2003 | Muller | |
| 7,107,380 B1 | 9/2006 | Mohan | |
| 7,430,681 B1 | 9/2008 | Hobbs | |
| 2002/0015409 A1 | 2/2002 | Gao et al. | |
| 2002/0181486 A1 | 12/2002 | Cantwell | |
| 2004/0047353 A1 | 3/2004 | Umayabashi et al. | |
| 2004/0179521 A1 | 9/2004 | Kim et al. | |
| 2004/0221163 A1 | 11/2004 | Jorgensen et al. | |
| 2004/0249933 A1 | 12/2004 | Govindarajan et al. | |
| 2005/0204027 A1 | 9/2005 | Claseman | |
| 2006/0018328 A1 | 1/2006 | Nody et al. | |
| 2006/0143335 A1 | 6/2006 | Ramamoorthy | |

(Continued)

OTHER PUBLICATIONS

RFC 793, published 1981 by Information Science Institue.*

(Continued)

*Primary Examiner* — Marcus R Smith
*Assistant Examiner* — Omeed D Rahgozar
(74) *Attorney, Agent, or Firm* — Duane S. Kobayashi

(57) ABSTRACT

Aspects of a system for keyboard, sound and mouse (KSM) over LAN A/V bridging and A/V bridging extensions for graphics thin client applications may include an I/O controller within an LAN subsystem, which enables generation of response data based on input signals from a keyboard device and/or mouse device that is coupled to a computing device. The generated response data may be encapsulated within an encapsulating PDU. The encapsulating PDU may comprise an Ethernet frame and/or and IP packet. The encapsulating PDU may be transmitted via a network based on a traffic class designation. The traffic class designation may enable the transmission of the generated response data via the network based on specified latency target values. A time stamp value may be generated for the encapsulating PDU. The encapsulating PDU may include at least one data type identifier, which indicates that the encapsulating PDU contains the generated response data.

8 Claims, 11 Drawing Sheets

(56) References Cited

U.S. PATENT DOCUMENTS

| | | |
|---|---|---|
| 2006/0230146 A1 | 10/2006 | Wang et al. |
| 2007/0005867 A1 | 1/2007 | Diamant |
| 2007/0061414 A1 | 3/2007 | Bakke |
| 2007/0083604 A1 | 4/2007 | Zimman et al. |
| 2007/0268823 A1 | 11/2007 | Madison et al. |
| 2008/0052426 A1 | 2/2008 | Montag |
| 2008/0101409 A1 | 5/2008 | West |
| 2008/0155124 A1* | 6/2008 | Compton et al. ............. 709/250 |
| 2008/0159304 A1* | 7/2008 | Ozugur et al. ................ 370/401 |
| 2008/0187028 A1 | 8/2008 | Lida |
| 2008/0205519 A1 | 8/2008 | Goodart |
| 2008/0240152 A1 | 10/2008 | Quinn et al. |
| 2008/0279186 A1 | 11/2008 | Winter et al. |
| 2008/0282299 A1* | 11/2008 | Koat et al. ....................... 725/93 |
| 2008/0285444 A1 | 11/2008 | Diab et al. |
| 2008/0285568 A1 | 11/2008 | Oren et al. |
| 2008/0285572 A1 | 11/2008 | Diab |
| 2008/0285576 A1 | 11/2008 | Teener et al. |
| 2008/0285643 A1 | 11/2008 | Diab |
| 2008/0288704 A1 | 11/2008 | Diab et al. |
| 2008/0288987 A1 | 11/2008 | Teener et al. |

OTHER PUBLICATIONS

IEEE 802a, published 2003 by IEEE computer Society.*
Michael Johas Teener, AV Bridging and Ethernet AV™, 67th IETF Meeting, San Diego, CA, USA, Nov. 5-10, 2006.
Michael Johas Teener, AV Bridging and Ethernet AV, 67th IETF Meeting, San Diego, CA, USA, Nov. 5-10, 2006.

* cited by examiner

METHOD AND SYSTEM FOR KEYBOARD, SOUND AND MOUSE (KSM) OVER LAN A/V BRIDGING AND A/V BRIDGING EXTENSIONS FOR GRAPHICS THIN CLIENT APPLICATIONS

CROSS-REFERENCE TO RELATED APPLICATIONS/INCORPORATION BY REFERENCE

This application makes reference to, claims priority to, and claims the benefit of U.S. Provisional Application Ser. No. 60/917,870, filed on May 14, 2007, which is hereby incorporated herein by reference in its entirety.

FIELD OF THE INVENTION

Certain embodiments of the invention relate to communication networks. More specifically, certain embodiments of the invention relate to a method and system for keyboard, sound and mouse (KSM) over LAN A/V bridging and A/V bridging extensions for graphics thin client applications.

BACKGROUND OF THE INVENTION

The generation and rendering of high end graphics often involves the movement of large quantities of data. Frequently the data is stored in a server, from which it may be accessed by users at computer workstations (or, more generally, at computing devices or thin clients) via a network. Once the data is received at the computing device, the graphics may be displayed on an attached video monitor. In many cases the video monitor is physically separate and has been conventionally attached to the computing device via an analog interface, such as a video graphics array (VGA) interface, or a digital interface such as a digital visual interface (DVI). In a typical configuration, an interface in the computing device is connected to a compatible interface in the video monitor via an interstitial connector, such as a cable.

In an alternative conventional configuration, the computing device (or thin client) may incorporate a video monitor. An example of this configuration is a laptop computer in which the video monitor is a component in the physical computing device unit. Whether the video monitor is physically incorporated within the computing device or is a physically separate device, the video monitor may or may not have touch screen capability.

Display Port is a digital interface standard, which enables a computing device to send graphics and video data to a video monitor, or multimedia display device, via a Display Port interface. In this regard, the Display Port interface standard may describe a point-to-point interface, which is capable of transmitting data from a device connected at one end of a connecting cable to a device connected at the other end of the connecting cable. The graphics and/or video data communicated across the Display Port interface may be sent in mini-packets as described in applicable standards. The mini-packets may contain information comprising instructions on how to render the graphics and/or video data on the video display screen, for example. The mini-packets may be sent via a plurality of data paths referred to as "lanes". In an exemplary Display Port interface, there may be four (4) such lanes. Display Port also enables multiple multimedia monitors to be connected to a computing device, each by a separate connecting cable. The computing device may selectively send Display Port mini-packets to one or more multimedia monitors via corresponding Display Port interfaces.

Multimedia applications may generate multimedia programs streams, which comprise video and audio data. The video and audio streams may be time synchronized to enable the rendering of video stream to correspond to the presentation of the audio stream. In interactive multimedia applications, mouse clicks to specific regions on the screen, or keyboard responses to information displayed on the video screen may result in the generation of data in response to the video display.

In addition to supporting unidirectional data traffic from the computing device to the computer monitor (or other attached video display device), the Display Port standard may also enable the bidirectional transfer of data. For example, the Display Port standard may allow for the exchange of encryption keys to enable the transfer of encrypted digital data across the Display Port interface. This capability may enable protection of digital content transferred across the Display Port interface.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for keyboard, sound and mouse (KSM) over LAN A/V bridging and A/V bridging extensions for graphics thin client applications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for keyboard, sound and mouse (KSM) over LAN A/V bridging and A/V bridging extensions for graphics thin client applications. Various embodiments of the invention comprise a method and system, which enable digital video to be sent from a video server to a computing device via a network and data from the computing device, entered via a keyboard and/or mouse in response to the received digital video, to be sent to the video server via the network utilizing AV Bridging capabilities.

In various embodiments of the invention, the video server may send a multimedia program to the computing device via the network. The multimedia program may comprise a video stream and an audio stream. Within an exemplary video server, the video stream may be output from a northbridge (NB) subsystem while the audio stream may be output from a southbridge (SB) subsystem. In various embodiments of the invention, the video server may utilize AV Bridging capabilities within the network to enable the time-correlated delivery of video stream data and audio stream data to a destination computing device. The AV Bridging capabilities within the network may enable time-correlated delivery of the video stream data and audio stream data, which is tolerant of latency jitter, which may interfere with time-correlated delivery within some conventional networks. The received the video stream may be sent to a video monitor attached to the computing device for rendering. The audio stream may be sent to an attached speaker for presentation. A user located at the computing device may generate response data based on input from a keyboard device and/or mouse device. The generated response data may be sent from the computing device to the video server via the network utilizing AV Bridging capabilities. The AV Bridging capabilities within the network may enable the response data to be transported across the network from the computing device to the video server within specified latency target values. In this aspect of the invention, the video server may be able to time-correlated the received response data to previously transmitted video stream data and/or audio stream data.

Figure 1:
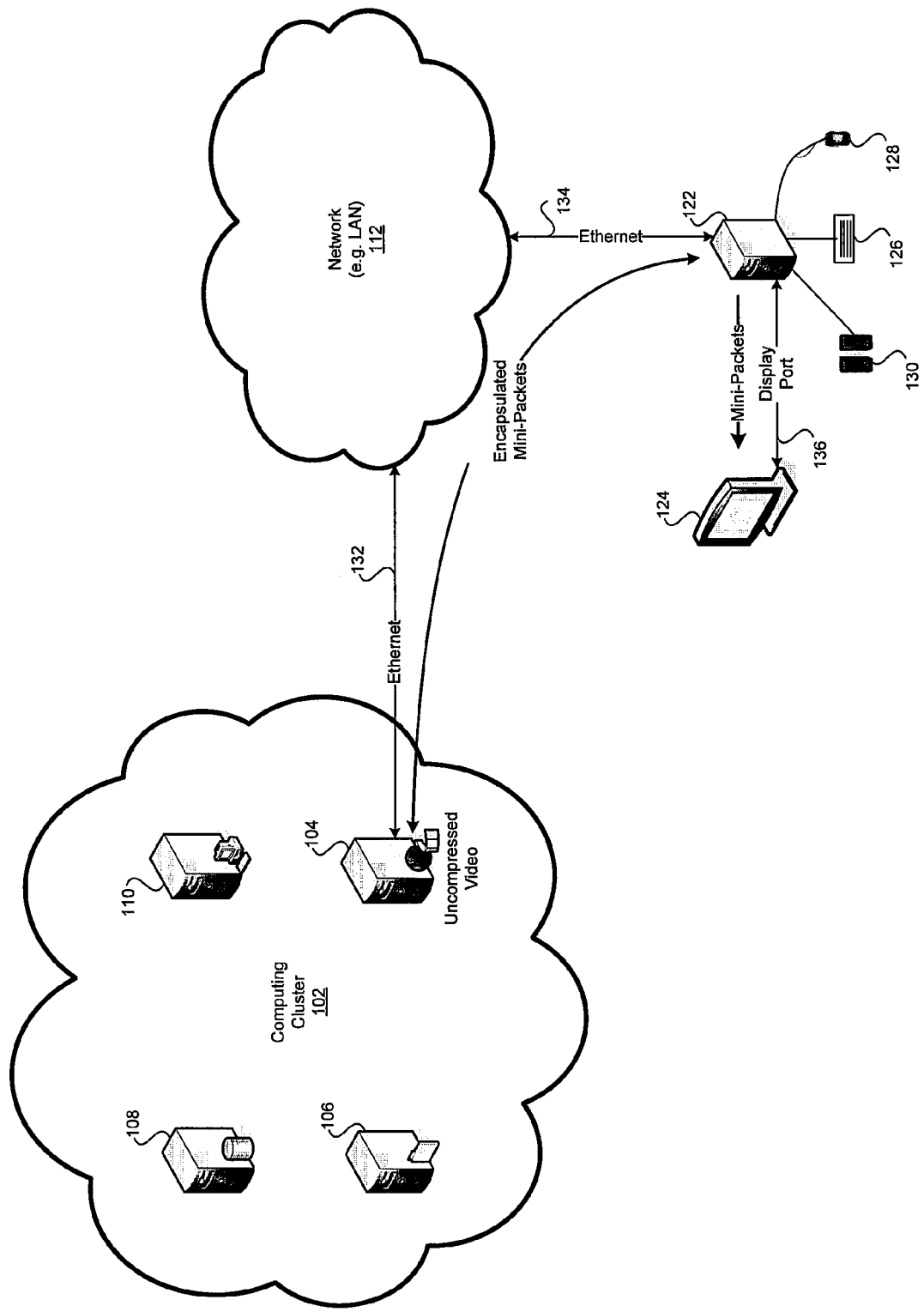
FIG. 1 is a diagram illustrating an exemplary system for transfer of Display Port data across a network, in accordance with an embodiment of the invention.

FIG. 1 is a diagram illustrating an exemplary system for transfer of Display Port data across a network, in accordance with an embodiment of the invention. Referring to FIG. 1, there is shown a computing cluster 102, a network 112, a computing device 122, a multimedia monitor 124, a keyboard 126, a mouse 128 and speakers 130. The computing cluster 102 may comprise a video server 104, a file server 106, a database server 108 and a network management server 110.

The computing cluster 102 may comprise a plurality of servers, each of which may perform one or more specific tasks, or execute one or more specific applications. Each server may store data which may be accessible to users at computing devices 122, which are attached to the network 112. The servers within the computer cluster 102 may communicate with each other, and/or with the network 112 via Ethernet interfaces. The video server 104 may store computer graphics data in addition to storing video, audio and/or multimedia programs. The multimedia monitor 124 may enable the rendering and display of visual images comprising video and/or graphics, for example.

The video server 104 may comprise hardware and/or software, which enables processing of graphics, video, audio and/or multimedia data. The computer graphics, video, audio and/or multimedia stored at the video server 104 may be accessible via the network 112. The file server 106 may store one or more files. The file server 106 may be utilized, for example, to store files from various users. The database server 108 may store one or more database programs, applications and/or files. The network management server 110 may store information pertaining to the configuration and/or availability of various network communications devices and/or interfaces. The network management server 110 may utilize a protocol such as the simple network management protocol (SNMP). The computing device 122 and multimedia monitor 124 may communicate via Display Port interfaces. The computing device 122 may communicate with the network 112 via an Ethernet interface.

In an exemplary mode of operation, the video server 104 may encapsulate the video data in one or more Display Port mini-packets. The video data may be uncompressed. In turn, the video server 104 may encapsulate the one or more Display Port mini-packets in one or more Ethernet frames. Alternatively, the video server 104 may directly encapsulate the digital video data in one or more Ethernet frames. The format of the Ethernet frames may be specified in applicable standards documents, such as IEEE 802 standards. The Ethernet frames may contain an address (for example, in a destination address field within the Ethernet frames), which indicates that the Ethernet frames are to be transported across the network 112, and delivered to the computing device 122. The Ethernet frames may comprise a designation (for example, in an EtherType field of the Ethernet frames), which indicates that the Ethernet frames are being utilized to encapsulate Display Port mini-packets. The Ethernet frames may also comprise a traffic class identifier, which may enable the network 112 to provide services in accordance with AV Bridging specifications. These services may comprise prioritized transport of the Ethernet frames across the network 112 to enable the time duration for transport across the network 112 to meet latency targets associated with the specified traffic class.

In connection with a multimedia program, the video server 104 may also encapsulate digital audio, which corresponds to the digital video, in one or more Ethernet frames. The destination address for the Ethernet frames may indicate that the Ethernet frames are also to be delivered to the computing device 122. The Ethernet frames may comprise a designation (such as the EtherType field), which may provide an indication that the Ethernet frames are being utilized to encapsulate digital audio. The encapsulated digital audio may comprise information, which time-correlates the digital audio to the corresponding digital video. The time-correlation may enable the computing device 122 to associate the digital audio stream and the digital video stream as belonging to a multimedia program. In addition, the time-correlation may enable the computing device 122 to time synchronize the rendering of the digital video to the presentation of the digital audio. The Ethernet frames, which encapsulate the digital audio, may also comprise a traffic class identifier. The traffic class identifier may enable the network 112 to provide services in accordance with AV Bridging specifications.

The video server 104 may time stamp the Ethernet frames, which encapsulate the digital video, and the Ethernet frames, which encapsulate the digital audio. The time stamping of Ethernet frames may enable the network 112 to transfer the Ethernet frames across the network 112 within specified latency target values. In addition, the time stamping may enable the network 112 to time-correlate the transport of Ethernet frames encapsulating digital video and the transport of Ethernet frames encapsulating digital audio. In this regard, the delivery of Ethernet frames to the computing device 122 via the network 112 may enable the computing device 122 to preserve the time-correlation relationship when rendering the digital video stream and presenting the digital audio stream. The video server 104 may transport the time stamped Ethernet frames via an Ethernet interface connector 132 to the network 112. The Ethernet frames may subsequently be transported from the network 112 to the computing device 122 via an Ethernet interface connector 134. An exemplary Ethernet interface connector may be a category 5 cable.

Upon receipt of the Ethernet frames, the computing device 122 may determine (for example, based on an identifier in the EtherType field of the received Ethernet frames) that the received Ethernet frames contain Display Port mini-packets. The computing device 122 may de-encapsulate the Display Port mini-packets. The computing device 122 may subsequently send the de-encapsulated Display Port mini-packets to the multimedia monitor 124 via the Display Port interface connector 136. The Display Port interface connector 136 may enable physical connection between the computing device and the multimedia monitor 124 via a point-to-point connection. The digital video contained within the Display Port mini-packets may then be rendered for display at the multimedia monitor 124.

The computing device 122 may determine that the received Ethernet frames contain digital audio data based on the EtherType field of the received Ethernet frames, for example. The computing device 122 may de-encapsulate the digital audio. In an exemplary embodiment of the invention, which may be practiced using speakers, the computing device 122 may subsequently send the de-encapsulated digital audio to the speakers 130. In an alternative exemplary embodiment of the invention, which is practiced in connection with analog speakers, the computing device 122 may convert the digital audio to an analog signal, such as a current, which may vary in amplitude and/or phase based on the digital audio. The analog signal may then be sent to the speakers 130.

In response to video rendered at the multimedia monitor 124 and/or audio presented via the speakers 130, a user at the computing device 122 may enter response data via a keyboard 126 and/or mouse 128. The computing device 122 may encapsulate the response data in one or more Ethernet frames. The Ethernet frames may also comprise an EtherType field, which indicates that the Ethernet frames encapsulate response data.

The computing device 122 may time stamp the Ethernet frames, which encapsulate the response data. The computing device may transmit the time stamped Ethernet frames via the Ethernet interface connector 134. The time stamping of Ethernet frames transmitted by the computing device 122 may enable the network 112 to transfer the Ethernet frames across the network 112 within specified latency target values.

Upon receipt of the Ethernet frames, the video server 104 may determine that the received Ethernet frames contain response data. The video server 104 may de-encapsulate the response data from the Ethernet frames. The video server 104 may subsequently process the response data and correlate the received response data to previously transmitted digital video data and/or digital audio data.

The video server 104 may utilize the received response data for data collection purposes, for example, to compile user preference information, or a user profile. The video server 104 may also utilize the received response data to modify subsequent transmitted digital video data and/or digital audio data. For example, in an instance in which the response data comprises a program termination request, the video server 104 may terminate subsequent transmission of digital video data and/or digital audio data to computing device 122.

In various embodiments of the invention, these functions may not be limited to KSM information but may also be practiced in a wide range of applications. In addition, the KSM information may trigger actions within the network.

Various embodiments of the invention comprise a method and a system, which may enable a user to utilize a keyboard 126 and/or mouse 128 device, coupled via point-to-point connection(s) to a computing device 122, to send response data to a video server 104 as though the keyboard 126 and/or mouse 128 device(s) were coupled to the video server 104 via point-to-point connection. Various embodiments of the invention also comprise a method and a system, which enable a video server 104 to generate a digital video stream and/or digital audio stream, enable the rendering of the digital video stream on a multimedia monitor 124 and/or the presentation of the digital audio stream on speakers 130, each of which may be coupled via point-to-point connection(s) to the computing device 122, as though the multimedia monitor 124 and/or the speakers 130 were coupled to the video server 104 via point-to-point connection(s).

Figure 2A:
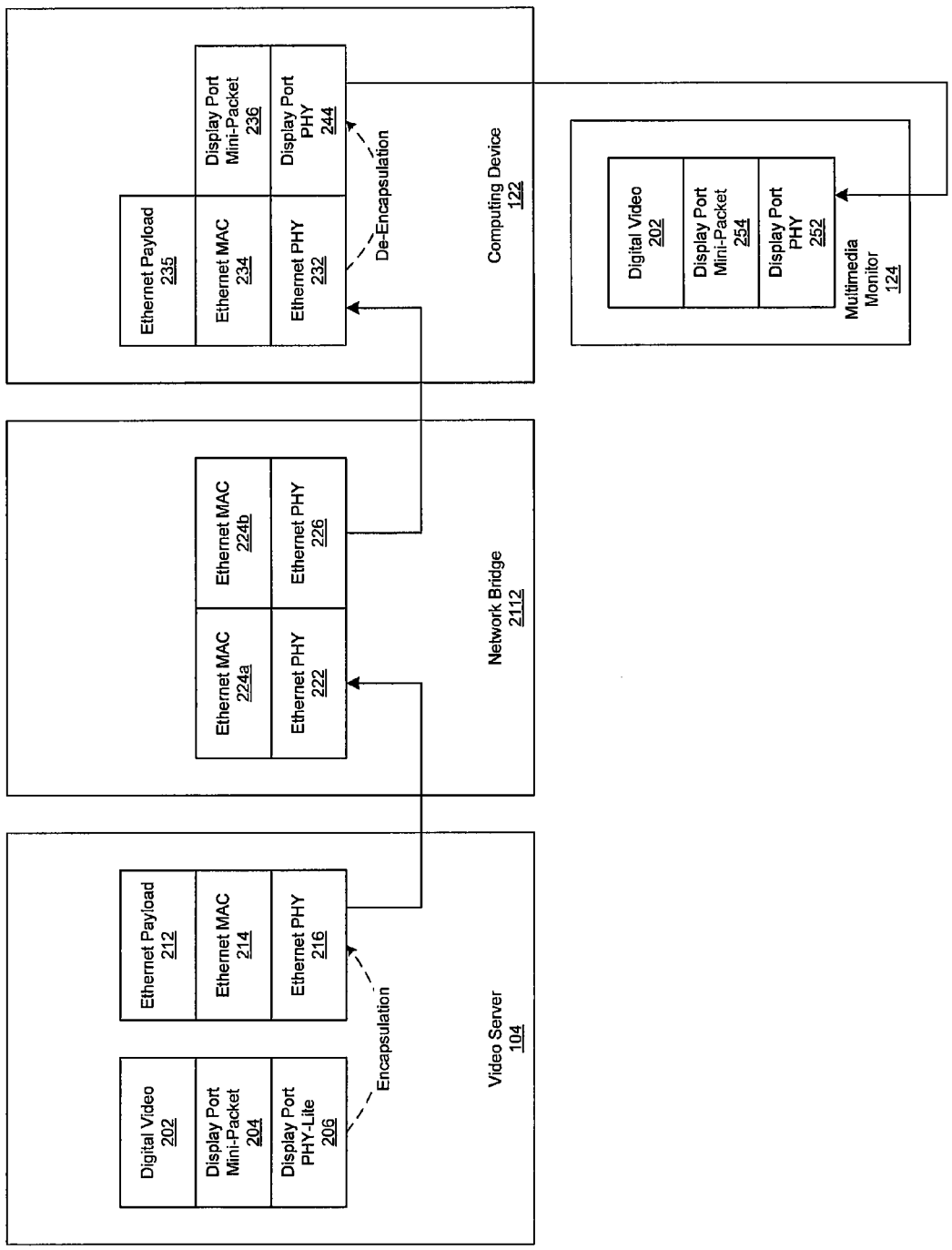
FIG. 2A is a diagram illustrating exemplary transfer of digital video encapsulated within Display Port mini-packets over Ethernet, in accordance with an embodiment of the invention.

FIG. 2A is a diagram illustrating exemplary transfer of digital video encapsulated within Display Port mini-packets over Ethernet, in accordance with an embodiment of the invention. Referring to FIG. 2A, there is shown the video server 104 (FIG. 1), a network bridge 2112, the computing device 122 and the multimedia monitor 124. The video server 104 may comprise digital video 202 and a plurality of protocol layers. The protocol layers may comprise a Display Port mini-packet layer 204, an Ethernet payload layer 212, a Display Port light physical (PHY-Lite) layer 206, an Ethernet medium access control (MAC) layer 214 and an Ethernet physical (PHY) layer 216. The network bridge 2112 may comprise one or more switching devices which comprise at least one Ethernet PHY layer 222 and 226 and at least one Ethernet MAC layer 224a and 224b. In various embodiments of the invention, the network bridge 2112 may support AV Bridging capabilities. The computing device 122 may comprise a plurality of protocol layers including an Ethernet payload layer 235, a Display Port Mini-Packet layer 236, an Ethernet MAC layer 234, an Ethernet PHY layer 232 and a Display Port PHY layer 244. The multimedia monitor 124 may comprise protocol layers related to the digital video 202 and to a plurality of protocol layers including a Display Port PHY layer 252 and a Display Port mini-packet layer 254. The Display Port PHY layer 244 may comprise suitable logic, circuitry and/or code that may enable generation of electrical and/or optical signals for transport via the Display Port interface connector 136. The Display Port PHY-Lite layer 206 may comprise logic, circuitry and/or code, which may enable generation of electrical and/or optical signals suitable for transport within the video server 104. However, the generated signals may not be suitable for transport of signals via an external interface.

In various embodiments of the invention, the digital video 202 may be generated by an application, which may be executing within the video server 104. The digital video 202 may then be encapsulated in Display Port mini-packets in the Display Port mini-packet layer 204. The Display Port mini-packets may also contain instructions to enable rendering of the digital video 202 on the multimedia monitor 124. A Graphics Processing Unit (GPU) may generate the Display Port mini-packets. The Display Port PHY-Lite layer 206 may enable reception of the Display Port mini-packets and generation of the line coded bits at a LAN subsystem within the video server 104. The line coded bits may be decoded and reassembled to form Ethernet payload(s). The Ethernet payload layer 212 may subsequently send the Ethernet payload(s) to the Ethernet MAC layer 214. The Ethernet MAC layer 214 may encapsulate the received Ethernet payload(s) in one or more Ethernet frames. The Ethernet frames may comprise information, which indicates that the Ethernet frames contain one or more encapsulated Display Port mini-packets and/or traffic class identification, for example. The Ethernet MAC layer 214 may send the Ethernet frames to the Ethernet PHY layer 216, which may enable transport of the Ethernet frames to the network 112 via the Ethernet interface connector 132. The traffic class identification may enable the utilization of AV Bridging services for the transport of the Ethernet frames within the network 112.

Within the network bridge 2112, the Ethernet PHY layer 222 may receive the Ethernet frames via the Ethernet interface connector 132. The Ethernet MAC layer 224a may enable the switching device to determine (based on the destination address field within the Ethernet frames, for example) that the computing device 122 is the destination device for receipt of the Ethernet frames. The Ethernet MAC layer 224b may send the Ethernet frames to the Ethernet PHY layer 226, which may enable transport of the Ethernet frames to the computing device 122 via the Ethernet interface connector 134.

Within the computing device 122, the Ethernet PHY layer 232 may receive the Ethernet frames via the Ethernet interface connector 134, which may be subsequently sent to the Ethernet MAC and MAC services layer 234. The Ethernet MAC and MAC services layer 234 may determine that the received Ethernet frames contain encapsulated Display Port mini-packets. The Ethernet MAC and MAC services layer 234 may de-encapsulate the Ethernet payloads from the received Ethernet frames. The Ethernet payload layer 235 may receive the Ethernet payload and generate one or more Display Port mini-packets. The Display Port mini-packets may then be sent to the Display Port mini-packet layer 236. The Display Port mini-packet layer 236 may determine that the received Display Port mini-packets are to be sent to the multimedia monitor 124. The Display Port mini-packet layer may send the Display Port mini-packets to the Display Port PHY layer 244, which may subsequently transmit the Display Port mini-packets to the multimedia monitor 124 via the Display Port interface connector 136.

Within the multimedia monitor 124, the Display Port PHY layer 252 may receive the Display Port mini-packets via the Display Port interface connector 136. The Display Port PHY layer 252 may send the received Display Port mini-packets to the Display Port mini-packet layer 254. The Display Port mini-packet layer 254 may extract the digital video 202 from the received Display Port mini-packets. The Display Port mini-packet layer 254 may also extract instructions contained within the Display Port mini-packets, which enable rendering of the digital video 202 at the multimedia monitor 124. The multimedia monitor 124 may then utilize the extracted instructions to display the digital video 202.

As shown in FIG. 2, in various embodiments of the invention, the video server 104 and the multimedia monitor 124 may process digital video, while the computing device 122 may not or may be limited in performance. Thus, in various embodiments of the invention, the computing device 122 may be a low cost appliance, which may not be required to comprise costly hardware and/or software to enable processing and/or rendering of high performance multimedia, video and/or graphics.

Various embodiments of the invention may not be limited to the transfer of Display Port mini-packets across a LAN. For example, in various embodiments of the invention, the Display Port mini-packets may be encapsulated within any of a variety of protocol data units (PDU) associated with higher layer protocols, for example a network layer protocol. An exemplary network layer protocol may be defined as set forth in a relevant protocol reference model (PRM), for example as specified by a standards organization such as the International Organization for Standardization (ISO).

In an exemplary embodiment of the invention, which utilizes a network layer protocol, Display Port mini-packets may be encapsulated within IP (Internet Protocol) packets. The IP packets may subsequently be encapsulated within Ethernet frames. Encapsulation of the Display Port mini-packets within IP packets may enable the transport of the encapsulated Display Port mini-packets across a network, such as the Internet. The transport of encapsulated Display Port mini-packets within IP packets may also utilize protocols such as the Reservation Protocol (RSVP) as defined by the Internet Engineering Task Force (IEFT), for example. The services provided by RSVP may be coordinated with AV Bridging services to support isochronous and/or real-time transmission of IP packets, which contain encapsulated Display Port mini-packets. In this regard, quality of service (QoS) aspects of RSVP (or similar higher layer protocol) may be mapped to the physical layer via AV Bridging to enable the transport of the encapsulated Display Port mini-packets across a network based on suitable bandwidth and latency targets.

Within the context of the ISO PRM, Ethernet functions related to medium access control (MAC) may be associated with the data link layer (DLL), while Ethernet functions related to line coding of data and generation of signals for transmission of bits via a physical medium may be associated with the physical layer (PHY). IP related functions may be associated with the network layer. At least a portion of a PDU for a given protocol layer may be encapsulated as a service data unit (SDU) within the PDU for the next lower protocol layer.

Figure 2B:
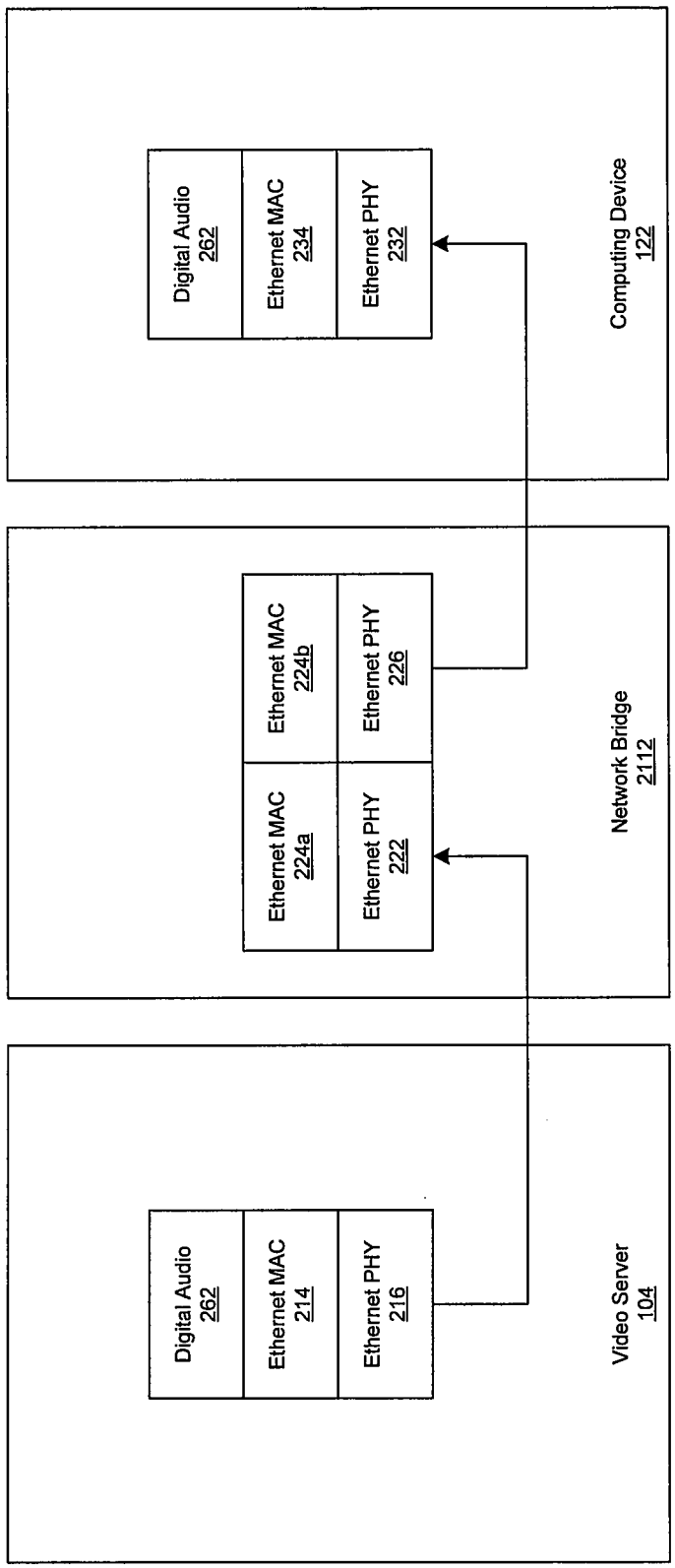
FIG. 2B is a diagram illustrating exemplary transfer of digital audio over Ethernet, in accordance with an embodiment of the invention.

FIG. 2B is a diagram illustrating exemplary transfer of digital audio over Ethernet, in accordance with an embodiment of the invention. Referring to FIG. 2B, there is shown the video server 104 (FIG. 1), the network bridge 2112 and the computing device 122. The video server 104 may comprise digital audio 262 and a plurality of protocol layers. The protocol layers may comprise the Ethernet MAC layer 214 and the Ethernet PHY layer 216. The network bridge 2112 may comprise at least one Ethernet PHY layer 222 and 226 and at least one Ethernet MAC layer 224a and 224b. The computing device 122 may comprise protocol layers related to the digital audio 262 and a plurality of protocol layers including the Ethernet MAC layer 234 and the Ethernet PHY layer 232.

In various embodiments of the invention, the digital audio 262 may be generated by an application, which may be executing within the video server 104. The digital audio 262 may be combined with the digital video 202 in a multimedia program, for example. The Ethernet MAC layer 214 may encapsulate the digital audio 262 in one or more Ethernet frames. The Ethernet frames may comprise information, which indicates that the Ethernet frames contain digital audio 262 and/or traffic class identification, for example. The Ethernet MAC layer 214 may send the Ethernet frames to the Ethernet PHY layer 216, which may enable transport of the Ethernet frames to the network 112 via the Ethernet interface connector 132. The traffic class identification may enable the utilization of AV Bridging services for the transport of the Ethernet frames within the network 112. The network 112 may enable the transport of the Ethernet frames from the video server 104 to the computing device 122.

Within the computing device 122, the Ethernet PHY layer 232 may receive the Ethernet frames via the Ethernet interface connector 134, which may be subsequently sent to the Ethernet MAC layer 234. The Ethernet MAC layer 234 may determine that the received Ethernet frames contain encapsulated digital audio 262. The Ethernet MAC layer 234 may de-encapsulate the digital audio 262 from the received Ethernet frames. The de-encapsulated digital audio 262 may be processed within the computing device 122 and/or output to an input/output (I/O) device, such as the speakers 130 for audio presentation.

Figure 2C:
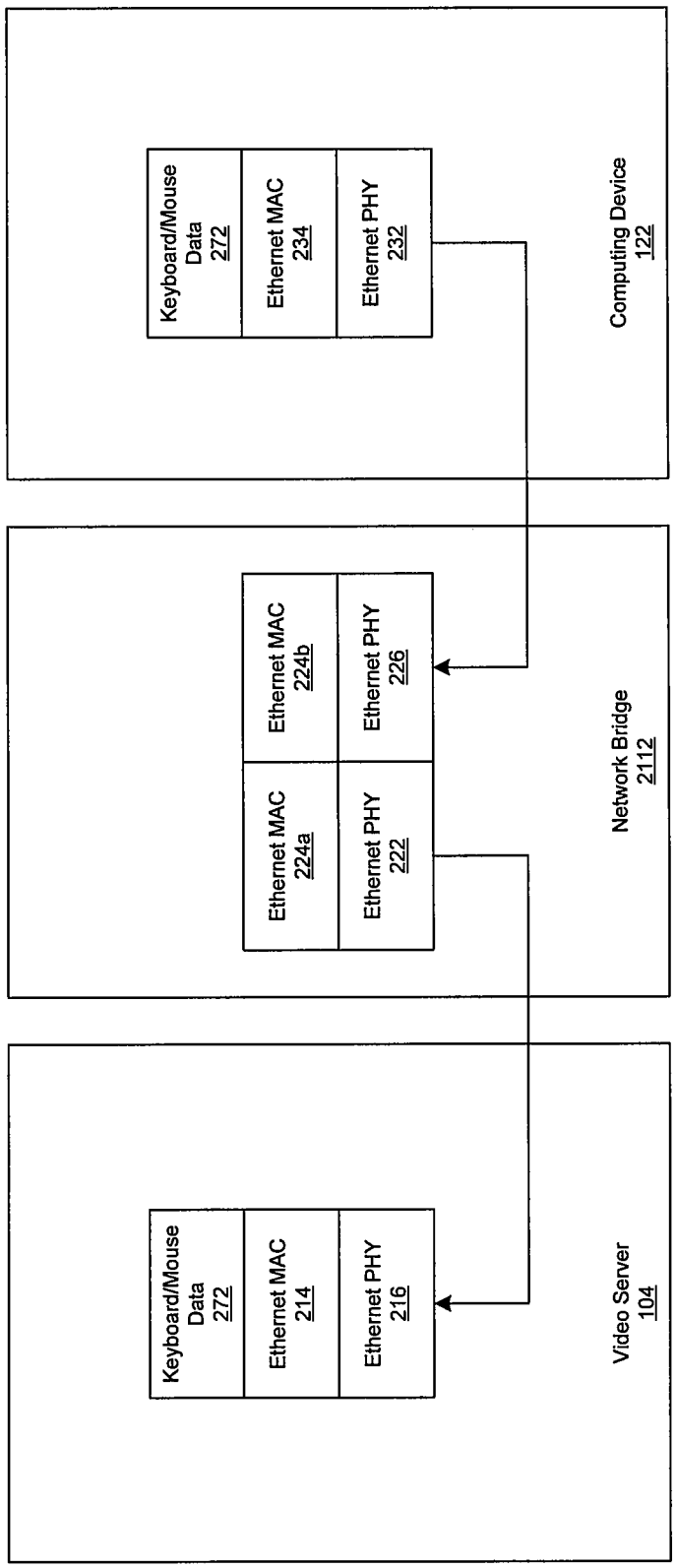
FIG. 2C is a diagram illustrating exemplary transfer of keyboard and/or mouse data over Ethernet, in accordance with an embodiment of the invention.

FIG. 2C is a diagram illustrating exemplary transfer of keyboard and/or mouse data over Ethernet, in accordance with an embodiment of the invention. Referring to FIG. 2C, there is shown the video server 104 (FIG. 1), the network bridge 2112 and the computing device 122. The video server 104 may comprise keyboard and/or mouse data 272 and a plurality of protocol layers. The protocol layers may comprise the Ethernet MAC layer 214 and the Ethernet PHY layer 216. The network bridge 2112 may comprise at least one Ethernet PHY layer 222 and 226 and at least one Ethernet MAC layer 224a and 224b. The computing device 122 may comprise protocol layers related to the keyboard and/or mouse data 272 and a plurality of protocol layers including the Ethernet MAC layer 234 and the Ethernet PHY layer 232.

In various embodiments of the invention, the keyboard/mouse data 272 may be generated at the computing device 122 in response to input from a keyboard device 126 and/or mouse device 128. The Ethernet MAC layer 234 may encapsulate the keyboard/mouse data 272 in one or more Ethernet frames. The Ethernet frames may comprise information, which indicates that the Ethernet frames comprise keyboard/mouse data 262 and/or traffic class identification, for example. The Ethernet MAC layer 232 may send the Ethernet frames to the Ethernet PHY layer 216, which may enable transport of the Ethernet frames to the network 112 via the Ethernet interface connector 134. The traffic class identification may enable the utilization of AV Bridging services for the transport of the Ethernet frames within the network 112. The network 112 may enable the transport of the Ethernet frames from the computing device 122 to the video server 104.

Within the video server 104, the Ethernet PHY layer 216 may receive the Ethernet frames via the Ethernet interface connector 132, which may be subsequently sent to the Ethernet MAC layer 214. The Ethernet MAC layer 214 may determine that the received Ethernet frames contain encapsulated keyboard/mouse data 272. The Ethernet MAC layer 214 may de-encapsulate the keyboard/mouse data 272 from the received Ethernet frames. The de-encapsulated keyboard/mouse 272 may be processed within the video server 104.

Figure 3:
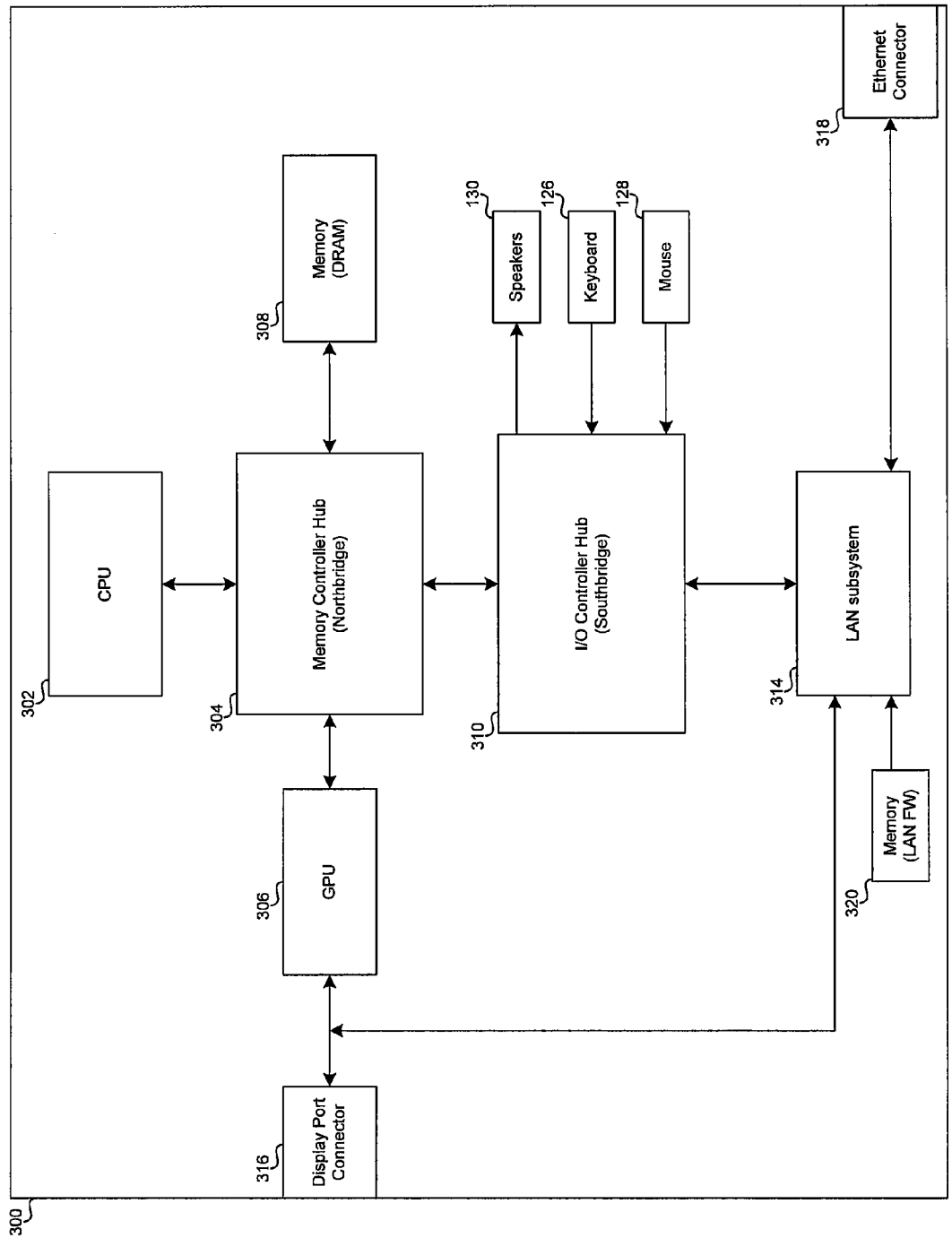
FIG. 3 is a diagram illustrating an exemplary system enabled to transmit and/or receive Display Port and/or Ethernet data streams, in accordance with an embodiment of the invention.

FIG. 3 is a diagram illustrating an exemplary system enabled to transmit and/or receive Display Port and/or Ethernet data streams, in accordance with an embodiment of the invention. Referring to FIG. 3 the system 300 may comprise a CPU 302, a memory controller hub (MCH) 304, a graphics processing unit (GPU) 306, a memory block 308, an input/output controller hub (ICH) 310, a keyboard device 126, a mouse device 128, speakers 130, a LAN subsystem 314, a DP connector 316, an Ethernet connector 318 and memory 320.

The CPU 302 may comprise suitable logic, circuitry, and/or code that may enable processing data and/or controlling operations of the system 300. In this regard, the CPU 302 may be enabled to provide control signals to the various other blocks comprising the system 300. The CPU 302 may also enable execution of applications programs and/or code. The applications programs and/or code may enable generation of digital video and/or graphics. The CPU 302 may also enable the retrieval of stored digital video and/or graphics. The CPU 302 may be accessed via the MCH 304.

The CPU 302 may enable the processing of response data received via the network 112. Response data may be received by the LAN subsystem 314 and subsequently communicated to the CPU 302 via the ICH 310 and/or MCH 304.

The MCH 304 may comprise suitable logic, circuitry, and/or code that may enable the storage and/or retrieval of data at high data transfer rates. For example, the MCH 304 may enable retrieval and/or storage of digital video and/or graphics data for high performance applications, such as high definition video, high resolution 3-D graphics, &c. In various embodiments of the invention, the MCH 304 may be referred to as a northbridge (NB).

The GPU 306 may comprise suitable logic, circuitry, and/or code for generating, rendering, and/or manipulating graphics data. The GPU 306 may output digital video and/or graphics. The GPU 306 may also output encrypted digital video and/or graphics for applications that utilize digital content protection, for example. The GPU 306 may encapsulate the digital video and/or graphics in Display Port mini-packets. The Display Port mini-packets generated by the GPU 306 may also comprise instructions, which enable rendering of the digital video and/or graphics for display on a multimedia monitor 124 (FIG. 1). The GPU 306 may also output protocol data units associated with other high definition (HD) protocols. The GPU 306 may comprise Display Port PHY layer functionality, which enables the GPU 306 to send and/or receive Display Port mini-packets via the Display Port connector 316.

The memory 308 may comprise suitable logic, circuitry, and/or code that may enable the storage and/or retrieval of data. For example, the memory 308 may enable the storage and/or retrieval of video and/or graphics data. The memory 308 may also enable the storage and/or retrieval of encryption keys, which may be utilized for encryption and/or decryption of data. The memory 308 may additionally store data, for example, configuration data and/or state variables utilized in controlling/configuring the various blocks of the system 300. The memory 308 may also enable the storage of code, which enables the execution of multimedia applications, for example. The memory 308 may utilize various technologies, such as dynamic random access memory (DRAM), which enable data to be stored and/or retrieved at sufficiently high data rates to enable high performance multimedia applications, for example.

The ICH 310 may comprise suitable logic, circuitry, and/or code that may enable the storage and/or retrieval of data from peripheral devices such as hard disk drives. The ICH 310 may also enable the retrieval of input signals and/or interrupt signals from peripheral devices, such as keyboard device and mouse devices, and/or other peripheral devices including various peripheral component interconnect (PCI) devices, for example. In various embodiments of the invention, the ICH 310 may be referred to as a southbridge (SB).

The LAN subsystem 314 may comprise suitable logic, circuitry, and/or code to enable the transmission and/or reception of Ethernet frames. The LAN subsystem 314 may comprise PHY layer functions and MAC layer functions. The LAN subsystem 314 may enable transmission and/or reception of Ethernet frames at various transfer rates, such as 10 Mbps, 100 Mbps, 1,000 Mbps (or 1 Gbps) and/or 10 Gbps, or other rates (for example, higher rates). The LAN subsystem 314 may also enable transmission and/or reception of Ethernet frames via wireless LANs (WLAN).

The PHY layer functions may enable transmission of Ethernet frames via a communication medium. The PHY layer functions may also enable reception of Ethernet frames via the communication medium. The PHY layer functions may generate signals for transmission that are suitable for the physical medium being utilized for transmitting the signals. For example, for an optical communication medium, the PHY layer may generate optical signals, such as light pulses, or for a wired communication medium, the PHY layer may generate electromagnetic signals.

The MAC layer functions may enable orderly communication between systems that are communicatively coupled via a shared communication medium. The MAC layer may comprise one or more coordination functions (CF) that enable a system to determine when it may attempt to access the shared communication medium. For example, in a wired communication medium, for example Ethernet, a CF may utilize a carrier sense multiple access with collision detection (CSMA/CD) algorithm. The MAC layer functions may implement mechanisms for scanning the communication medium to determine when it is available for transmission of signals. The MAC layer functions may comprise back off timer mechanisms, which may be utilized by a system to determine how often to attempt to access a communication medium, which is currently determined to be unavailable.

The MAC layer functions may also enable AV Bridging capabilities. In this regard, the MAC layer functions may determine a traffic class which is associated with transmitted Ethernet frames. Based on the determined traffic class, the MAC layer functions may perform traffic shaping by determining a time instant at which an Ethernet frame may be sent to the network via the Ethernet interface. That time instant may be determined based on a time instant at which one or more preceding Ethernet frames were also transmitted via the Ethernet interface. The time instant may also be determined based on stored "credits", which may indicate a quantity of octets of Ethernet frame data that may be transmitted at "line rate" before transmission of subsequent Ethernet frames is suspended pending the accumulation of additional credits.

The MAC layer functions, which support AV Bridging, may also enable the end-to-end transport of Ethernet frames based on specified latency targets by initiating admission control procedures. The latency targets, which may specify a maximum time duration for the transport of Ethernet frame across the network, may be determined based on a specified traffic class. A destination Ethernet device may initiate admission control procedures by initiating a registration request across the network to the source Ethernet device. A successful registration may enable the network to reserve resources for the transport of Ethernet frames between the source Ethernet device and the destination Ethernet device, in accordance with the specified latency targets.

The Ethernet MAC layer functions may also enable an exchange of timing synchronization information between communicating Ethernet devices. Individual Ethernet MAC layer functions associated with each of a plurality of Ethernet devices within a LAN may exchange timing synchronization with the Ethernet MAC layer function associated with a specified Ethernet device associated with the LAN, wherein the specified Ethernet device may provide system timing for the plurality of Ethernet devices associated with the LAN. The traffic shaping and/or timing synchronization capabilities may enable AV Bridging services to support isochronous and/or real time services, such as streaming media services.

In various embodiments of the invention, the MAC layer functions within the LAN subsystem 314 may enable the reception of Display Port mini-packets and encapsulation of the received Display Port mini-packets within Ethernet frames. The Ethernet frames may utilize AV Bridging services when being transmitted via the network 112. The MAC layer functions within the LAN subsystem 314 may also enable the reception of Ethernet frames and the de-encapsulation of Display Port mini-packets from Ethernet frames, which are determined to contain encapsulated Display Port mini-packets.

The LAN subsystem 314 may enable the reception of digital audio data and encapsulation of the received digital audio data within Ethernet frames. The Ethernet frames may utilize AV Bridging services when being transmitted via the network 112. The LAN subsystem 314 may enable time-synchronization of transmitted Ethernet frames, which encapsulate Display Port mini-packets, and transmitted Ethernet frames, which encapsulate digital audio. The MAC layer functions within the LAN subsystem 314 may also enable the reception of Ethernet frames, which are determined to contain encapsulated digital audio data.

The LAN subsystem 314 may enable the reception of keyboard/mouse data and encapsulation of the received keyboard/mouse data within Ethernet frames. The Ethernet frames may utilize AV Bridging services when being transmitted via the network 112. The MAC layer functions within the LAN subsystem 314 may also enable the reception of Ethernet frames, which are determined to contain encapsulated keyboard/mouse data.

In various embodiments of the invention, the LAN subsystem 314 may utilize code, such as firmware, and/or data stored within the memory 320 to enable the operation of MAC layer functions and/or PHY layer functions within an Ethernet LAN, for example. The firmware may also enable encapsulation of Display Port mini-packets and/or digital video and/or graphics in Ethernet frames within the LAN subsystem 314. In addition, the firmware may enable de-encapsulation of Display Port mini-packets and/or digital video and/or graphics from Ethernet frames. The firmware may enable the encapsulation of digital audio data in Ethernet frames and/or the de-encapsulation of digital audio data from Ethernet frames. The firmware may enable the time-correlated transmission of Ethernet frames, which encapsulate Display Port mini-packets, and of Ethernet frames, which encapsulate digital audio data. The firmware may enable the encapsulation of keyboard/mouse data in Ethernet frames and/or the de-encapsulation of keyboard/mouse data from Ethernet frames.

The Display Port connector 316 may enable physical connection of a Display Port interface connector 136 to the system 300. The physical connection may comprise at least conductors for each of the 4 lanes in the Display Port interface and for an auxiliary (AUX) channel. The 4 lanes may enable the transmission or reception of Display Port mini-packets, while the AUX channel may enable transmission and reception of control signals, input from peripheral devices, such as keyboards and/or mouse device, and for the exchange of encryption keys.

The Ethernet connector 318 may enable physical connection of an Ethernet interface connector 132 to the system 300.

The Ethernet connector 318 may enable physical connection via an 8P8C connector and/or via in RJ45 connector, for example.

Various embodiments of the invention may enable rendering of digital video 202 and/or graphics on a multimedia monitor 124, which has a direct physical connection to the system 300 via a Display Port interface connector 136 without requiring that the system 300 comprise digital video and/or graphics processing capabilities. In an exemplary embodiment of the invention, the system 300 may comprise a computing device 122. In operation, the system 300 may receive Ethernet frames via the Ethernet connector 318. The LAN subsystem 314 within the computing device 122 may receive the Ethernet frames and determine that the received Ethernet frames contain encapsulated Display Port mini-packets. The LAN subsystem 314 may de-encapsulate the Display Port mini-packets. The LAN subsystem may utilize Display Port PHY layer 244 functionality to transmit the de-encapsulated Display Port mini-packets to a multimedia monitor 124 (FIG. 1) via the Display Port connector 316. The multimedia monitor 124 may render digital video 202 contained within the Display Port mini-packets for visual display.

The LAN subsystem 314 may determine that the received Ethernet frames contain encapsulated digital audio data. The LAN subsystem 314 may de-encapsulate the digital audio data. In response to receipt of the digital audio data, the LAN subsystem 314 may send an interrupt signal to the ICH 310. The interrupt may trigger an ISR, which may enable the ICH 310 to respond to the interrupt signal. The ICH 310 may respond to the interrupt signal by requesting that the LAN subsystem 314 transfer the digital audio data. In response, the LAN subsystem 314 may send the digital audio data to the ICH 310. The ICH 310 may send the digital audio data to the speakers 130 for audio presentation.

The system 300 may utilize the AUX channel to transmit data signals. In an exemplary embodiment of the invention, a computing device 122 may send station identification information to the video server 104 via the AUX channel. The ability to send station identification information, for example, may enable the computing device 122 to be utilized in universal plug and play (UPnP) networks. The CPU 302 may generate the station identification information, which may be sent to the GPU 306 via the MCH 304. The GPU 306 may send the station identification information via the AUX channel.

The ICH 310 may receive signals generated in response to input from a keyboard device and/or from a mouse device, for example. The ICH 310 may receive the input from the keyboard device 126 and/or mouse device via 128 one or more PCI interfaces. The ICH 310 may send the signals to the LAN subsystem 314. In various embodiments of the invention, the signals sent from the ICH 310 to the LAN subsystem 314 may comprise copies of the signals received by the ICH 310 from the keyboard device 126 and/or mouse device 128. The LAN subsystem 314 may generate signal level indicators based on the signals. The signal level indicators may comprise measurements of the received signals at various time instants. The LAN subsystem 314 may generate distinct sets of signal level indicators for the keyboard device 126 and the mouse device 128. The LAN subsystem 314 may encapsulate the signal level indicators in one or more Ethernet frames. The keyboard/mouse data generated by the LAN subsystem 314 may comprise one or more signal level indicators. The Ethernet frames may contain a designation within the EtherType field, which indicates that the Ethernet frame encapsulates keyboard/mouse data. The Ethernet frames may be transmitted via the Ethernet connector 318.

In another exemplary embodiment of the invention, the system may comprise a video server 104. In operation, the CPU 302 may enable generation of digital video 202. The CPU 302 may also enable the retrieval of digital video 202 from memory 308. The MCH 304 may enable the high speed transfer of digital video 202 from the CPU 302 and/or from the memory 308 to the GPU 306. The GPU 306 may process the digital video to, for example, incorporate graphics. The GPU 306 may also generate instructions, which enable the rendering of the processed digital video on a multimedia monitor 124. The GPU 306 may generate one or more Display Port mini-packets, each of which may comprise at least a portion of the generated rendering instructions and/or processed digital video.

The GPU 306 may output the Display Port mini-packets to the LAN subsystem 314. The LAN subsystem 314 may encapsulate the Display Port mini-packets in Ethernet frames. The LAN subsystem 314 may utilize Ethernet MAC layer 214 functionality to enable the utilization of AV Bridging capabilities for the transport of the Ethernet frames via the network 112. The LAN subsystem 314 may utilize Ethernet PHY layer 216 functionality to enable the transmission of the Ethernet frames via the Ethernet connector 318.

The system 300 may receive Ethernet frames via the Ethernet connector 318. The LAN subsystem 314 within the video server 104 may receive the Ethernet frames and determine that the received Ethernet frames comprise encapsulated AUX channel data. The LAN subsystem 314 may de-encapsulate the AUX channel data. The LAN subsystem 314 may transmit the de-encapsulated data to the GPU 306 via the AUX channel. The GPU 306 may send the data to the CPU 302 for processing via the MCH 304.

The LAN subsystem 314 may determine that the received Ethernet frames may contain encapsulated response data. The LAN subsystem 314 may de-encapsulate the response data from within the Ethernet frames. In response to receipt of the response data, the LAN subsystem 314 may send an interrupt signal to the ICH 310. The interrupt signal may trigger an ISR, which may enable the ICH 310 to respond to the interrupt signal. The ICH 310 may respond to the interrupt signal by requesting that the LAN subsystem 314 transfer the response data. In response, the LAN subsystem 314 may transmit the response data to the CPU 302 via the ICH 310 and the MCH 304.

Figure 4:
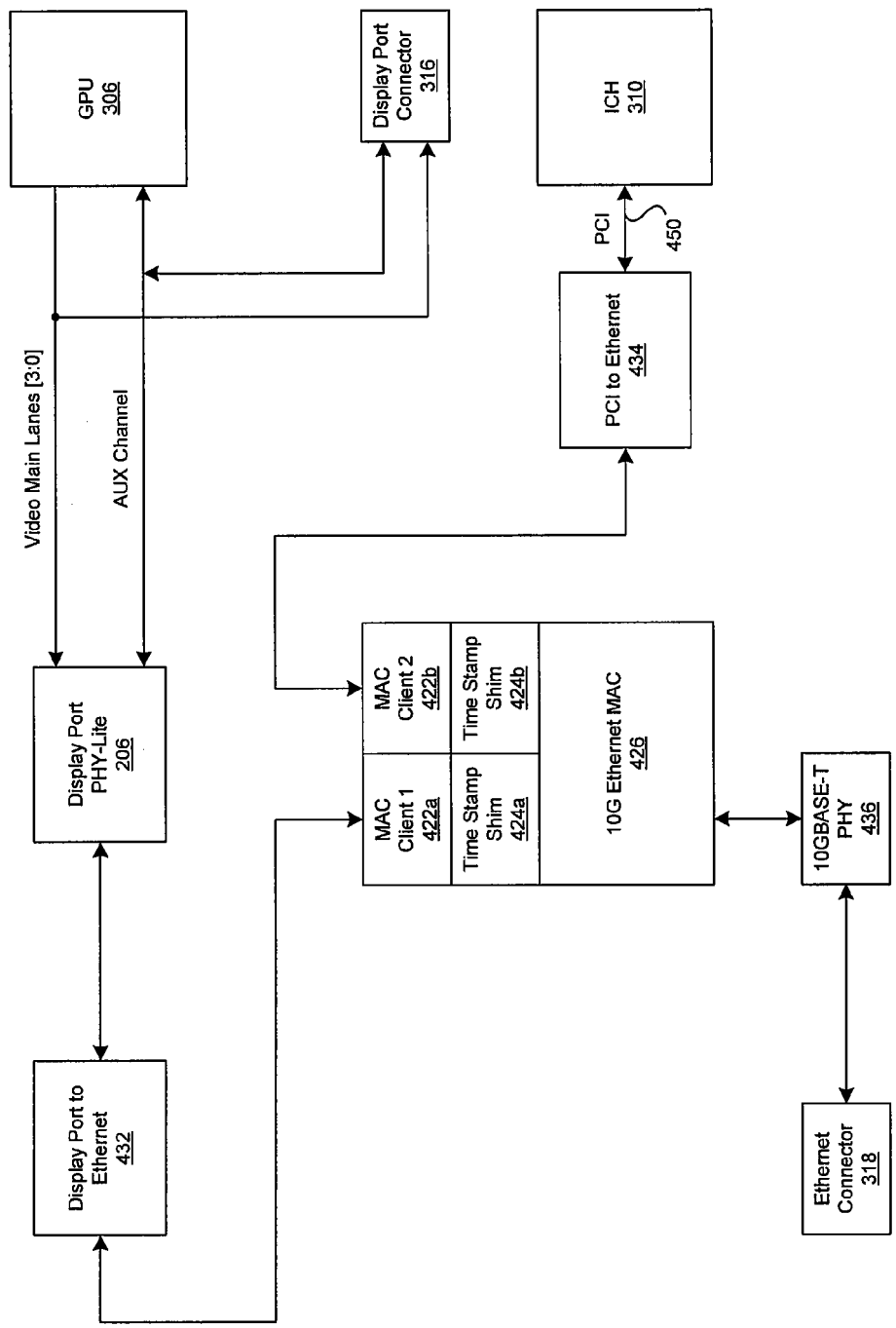
FIG. 4 is a block diagram of an exemplary server system, which supports presentation of digital audio at an Ethernet thin client, in accordance with an embodiment of the invention.

FIG. 4 is a block diagram of an exemplary server system, which supports presentation of digital audio at an Ethernet thin client, in accordance with an embodiment of the invention. In various embodiments of the invention, the video server 104 (FIG. 1) may represent an exemplary server system, which may support video rendering by an Ethernet thin client. The computing device 122 may represent an exemplary Ethernet thin client. Referring to FIG. 4, there is shown a MAC client 422a, MAC client 422b, time stamp shims 424a and 424b, 10G Ethernet MAC block 426, Display Port to Ethernet block 432, PCI to Ethernet block 434, 10GBASE-T PHY layer block 436, Display Port PHY-Lite layer 206 (from FIG. 2), GPU 306 (from FIG. 3), ICH 310 (from FIG. 3), Display Port connector 316 (from FIG. 3) and Ethernet connector 318 (from FIG. 3).

The GPU 306 may encapsulate data in one or more Display Port mini-packets. The Display Port mini-packets may comprise an identifier, which indicates whether the Display Port mini-packets contain video data or other types of data. The GPU 306 may transmit Display Port mini-packets, which contain video data, via the Video Main Lanes [3:0]. The GPU 306 may transmit Display Port mini-packets, which contain other than video data, via the Aux Channel.

The Display Port PHY-Lite layer 206 may receive Display Port mini-packets via at least the Video Main Lanes [3:0] and AUX Channel. The Display Port PHY-Lite layer 206 may generate binary bits.

The Display Port to Ethernet block 432 may enable reception of bits from a Display Port PHY-Lite layer 206. The Display Port to Ethernet block 432 may enable assembly of the bits to form one or more Ethernet payloads. An Ethernet payload may comprise one or more bits from one or more Display Port mini-packets, MP. In an exemplary embodiment of the invention, the Ethernet payload may comprise a plurality of concatenated Display Port mini-packets. In another exemplary embodiment of the invention, the Ethernet payload may comprise a concatenation of payloads from a plurality of Display Port mini-packets with a single Display Port mini-packet header appended to the concatenated payloads.

The MAC client 422a may receive Ethernet payloads from the Display Port to Ethernet block 432 and encapsulate the Ethernet payloads in one or more Ethernet frames, $EF_1$. The Ethernet frames, $EF_1$, may comprise EtherType=DP (where DP may represent a numerical value), which indicates that the Ethernet frames $EF_1$ contain encapsulated Display Port mini-packets. In addition, the Ethernet frames, $EF_1$, may also comprise a field EtherTypeSubType=VID (where VID may represent a numerical value), which indicates that the Display Port mini-packets may contain video data. The Ethernet frames, $EF_1$, may comprise a field EtherTypeSubType=AUX (where AUX may represent a numerical value), which indicates that the Ethernet payloads contain AUX channel data. The subtype may also indicate one or a plurality of multimedia monitors, attached to a computing device, which is to receive the Display Port mini-packets.

The ICH 310 may enable reception of data from the CPU 302, memory 308 and/or the GPU 306 via the MCH 304. The data from the CPU 302, memory 308 and/or GPU 306 may comprise digital audio data 262. The ICH may also enable reception of input signals from peripheral devices such as a keyboard device 126 and/or a mouse device 128. The signals received by the ICH 310 may be transferred via a interface 450.

The PCI to Ethernet block 434 may enable reception of signals from the interface 450. The PCI to Ethernet block 434 may enable the generation of signal indicators based on the received signals. The PCI to Ethernet block 434 may enable the generation of bits based on the generated signal indicators. The PCI to Ethernet block 434 may enable assembly of the bits to construct one or more Ethernet payloads EP. The PCI to Ethernet block 434 may output the constructed Ethernet payloads EP.

The PCI to Ethernet block 434 may generate bits based on received Ethernet payloads EP. The PCI to Ethernet block 434 may enable the generation of interrupts to indicate receipt of Ethernet payloads EP.

The MAC client 422b may receive Ethernet payloads, EP, and encapsulate the Ethernet payloads in one or more Ethernet frames, $EF_2$. The Ethernet frames $EF_2$ may comprise EtherType≠DP, which indicates that the Ethernet frames $EF_2$ may not contain Display Port mini-packets. The Ethernet frames $EF_2$ may comprise EtherTypeSubType=DA (where DA may represent a numerical value), which indicates that the Ethernet frames $EF_2$ contain digital audio data. The Ethernet frames $EF_2$ may comprise EtherType≠DP and EtherTypeSubType≠DA, which indicates that the Ethernet frames $EF_2$ may not contain Display Port mini-packets or digital audio data.

The time stamp shims 424a and 424b may receive Ethernet frames $EF_1$ and $EF_2$ from the corresponding MAC clients 422a and 422b. The time stamp shims 424a and 424b may append time synchronization information, such as a time stamp, to the Ethernet frames $EF_1$ and $EF_2$ based on an EtherType designation, for example. The time stamp shims 424a and 424b may append a time stamp when the EtherType field indicates that the Ethernet frame is to utilize AV Bridging capabilities for transport across a network 112, for example. In an exemplary embodiment of the invention, the time stamp shims 424a and 424b may append a time stamp value to the Ethernet frames $EF_1$ and $EF_2$, which enable time-correlation of the contents of the Ethernet frames $EF_1$ and $EF_2$. In this aspect of the invention, the Ethernet frame $EF_1$ may encapsulate the digital video data portion of a multimedia program, which is to be time-correlated to the digital audio data portion. The digital audio data portion may be encapsulated within the Ethernet frame $EF_2$.

The 10G Ethernet MAC block 426 may enable the transmission of the Ethernet frames $EF_1$ and $EF_2$ via the network 112. The 10G Ethernet MAC block 426 may enable generation of header information within the Ethernet frames, which enable the utilization of AV Bridging services within the network 112 for transport of the Ethernet frames. The 10G Ethernet MAC block 426 may also enable traffic shaping of transmitted Ethernet frames by determining time instants at which the Ethernet frames $EF_1$ and $EF_2$ may be transmitted to the network 112. The 10G Ethernet MAC block 426 may also enable generation of header information within the Ethernet frames, which utilize conventional Ethernet services within the network 112. The conventional Ethernet services may not utilize traffic shaping and/or AV Bridging services, for example.

The 10GBASE-T PHY layer 436 may enable the reception of bits from Ethernet frames. The 10GBASE-T PHY layer 436 may line encode the received bits to enable transmission via an Ethernet connector 318. 10G is an exemplary Ethernet bit rate; various embodiments of the invention may also be practiced at other bit rates suitable for carrying HD traffic.

The 10GBASE-T PHY layer 436 may also receive line coded bits via the Ethernet connector 318. The 10GBASE-T PHY layer 436 may decode the received line coded bits, which may be sent to the 10G Ethernet MAC block 426. The 10G Ethernet MAC block 426 may assemble the received decoded bits to construct one or more Ethernet frames $EF_R$. The 10G Ethernet MAC block 426 may determine whether the constructed Ethernet frames $EF_R$ contain one or more Display Port mini-packets, $MP_R$, or Ethernet payloads, $EP_R$, which may not contain Display Port mini-packets. The 10G Ethernet MAC block 426 may make the determination based on a designation within EtherType field within the received Ethernet frames $EF_R$. The 10G Ethernet MAC block 426 may send the Ethernet frames $EF_R$ to the time stamp shim 424a or 424b.

The time stamp shim 424a may send Ethernet frames, $EF_R$, which contain encapsulated Display Port mini-packets, to the MAC client 422a. The MAC client 422a may determine whether the Ethernet frames contain video data or AUX Channel data based on an EtherTypeSubType field within the Ethernet frames. The MAC client 422a may de-encapsulate the AUX channel data from the Ethernet frames $EF_R$. The MAC client 422a may send the Ethernet payloads to the Display Port to Ethernet block 432. The Display Port to Ethernet block 432 may convert the Ethernet payloads to bits, which may be sent to the Display Port PHY-Lite layer 206. The Display Port PHY-Lite layer 206 may assemble the bits to reconstruct the AUX channel data. The AUX channel data may be sent to the GPU 306 via the AUX Channel. The GPU 306 may transfer the data to the MCH 304. The MCH 304 may in turn transfer the data to the CPU 302, which may process the data. The AUX channel data may be sent to the multimedia monitor 124 via the AUX Channel.

The time shim 424b may send Ethernet frames, $EF_R$, which do not comprise encapsulated Display Port mini-packets to the MAC client 422b. At the video server 104, the Ethernet frames $EF_R$ may contain response data sent from a computing device 122, for example. The MAC client 422b may de-encapsulate the Ethernet payloads, $EP_R$, from the received Ethernet frames $EF_R$. The MAC client 422b may send the Ethernet payloads $EP_R$ to the PCI to Ethernet block 434. Receipt of Ethernet frames $EF_R$, which comprise response data, may cause the PCI to Ethernet block 434 to generate an interrupt signal. The interrupt signal may be received by the CPU 302, which may trigger an ISR. The ISR may select a device driver routine, which determines that the response data contained in the Ethernet payloads $EF_R$ are to be sent to the CPU 302. The PCI to Ethernet block 434 may convert the Ethernet payloads $EP_R$ to signals, which may be sent to the ICH 310. The ICH 310 may convert the signals to bits, which may be sent to the CPU 302 via the MCH 304. The CPU 302 may process the data.

In an exemplary embodiment of the invention, the LAN subsystem 314 may comprise the Display Port to Ethernet block 432, the Display Port PHY-Lite layer 206, the MAC clients 422a and 422b, the time stamp shims 424a and 424b, the 10G Ethernet MAC block 426 and the PCI to Ethernet block 434. In another exemplary embodiment of the invention, the LAN subsystem 314 may comprise the Display Port to Ethernet block 432, the Display Port PHY-Lite layer 206, the MAC clients 422a and 422b, the time stamp shims 424a and 424b, the 10G Ethernet MAC block 426, the PCI to Ethernet block 434 and the 10 GBASE-T PHY layer block 436.

Various embodiments of the invention as shown in FIG. 4 may not be limited to 10G Ethernet networks, but may also be practiced in 100G Ethernet networks and/or 1000G Ethernet networks, for example.

Figure 5:
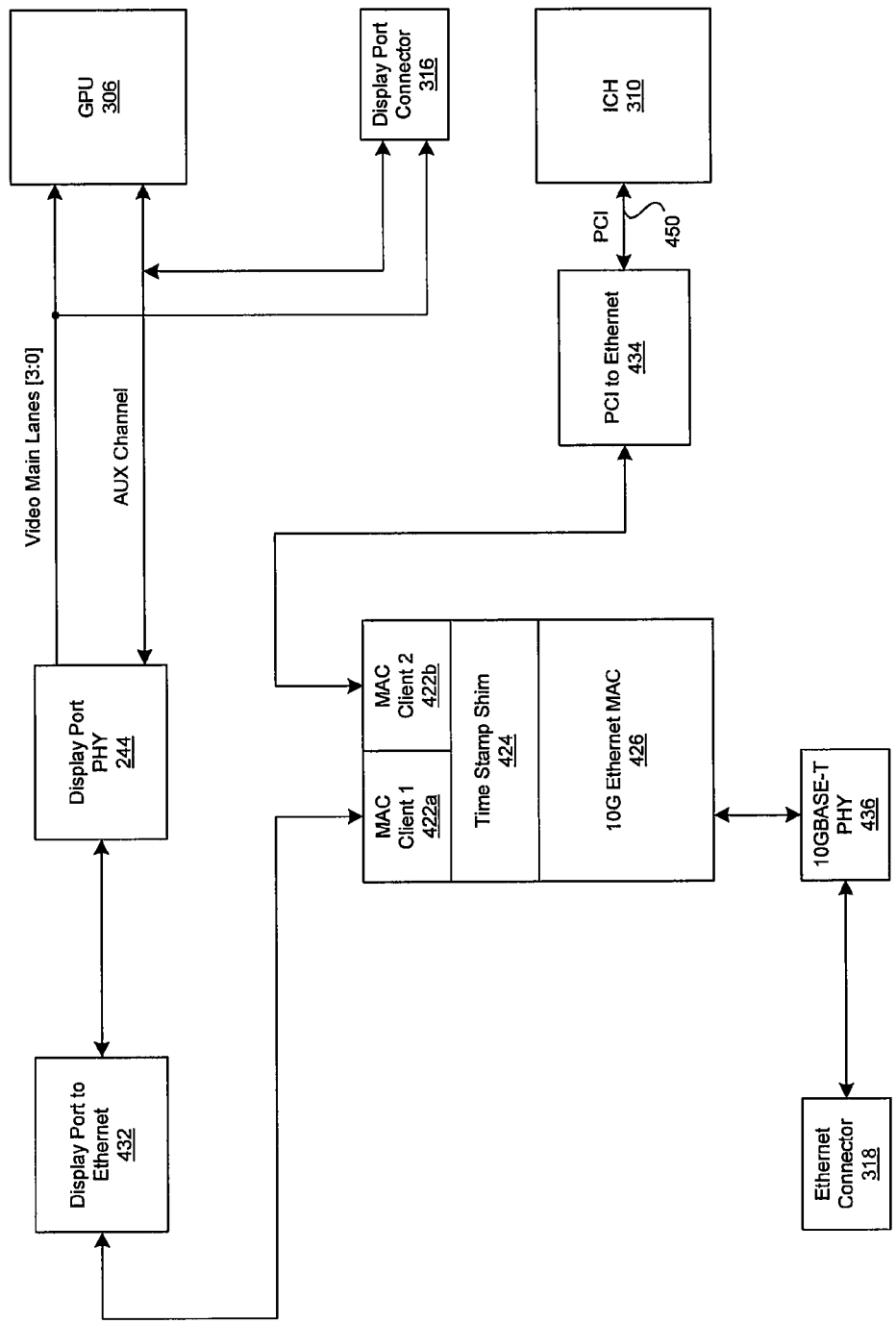
FIG. 5 is a block diagram of an exemplary thin client, in accordance with an embodiment of the invention.

FIG. 5 is a block diagram of an exemplary thin client, in accordance with an embodiment of the invention. In various embodiments of the invention, the computing device 122 (FIG. 1) may represent an exemplary Ethernet thin client. Referring to FIG. 5, there is shown a MAC client 422a, MAC client 422b, time stamp shims 424a and 424b, 10G Ethernet MAC block 426, Display Port to Ethernet block 432, PCI to Ethernet block 434, 10GBASE-T PHY layer block 436, Display Port PHY layer 244 (from FIG. 2), GPU 306 (from FIG. 3), ICH 310 (from FIG. 3), Display Port connector 316 (from FIG. 3) and Ethernet connector 318 (from FIG. 3).

The 10GBASE-T PHY layer 436 may receive line coded bits via the Ethernet connector 318. The 10GBASE-T PHY layer 436 may decode the received line coded bits, which may be sent to the 10G Ethernet MAC block 426. The 10G Ethernet MAC block 426 may assemble the received decoded bits to construct one or more Ethernet frames $EF_R$. The 10G Ethernet MAC block 426 may determine whether the constructed Ethernet frames $EF_R$ contain one or more Display Port mini-packets, $MP_R$, or Ethernet payloads, $EP_R$, which may not contain Display Port mini-packets. The 10G Ethernet MAC block 426 may make the determination based on a designation within EtherType field within the received Ethernet frames $EF_R$. The 10G Ethernet MAC block 426 may send the Ethernet frames $EF_R$ to the time stamp shim 424a or 424b.

The time stamp shim 424a may send Ethernet frames, $EF_R$, which contain encapsulated Display Port mini-packets, to the MAC client 422a. The MAC client 422a may determine whether the Ethernet frames contain video data or AUX Channel data based on an EtherTypeSubType field within the Ethernet frames. At a computing device 122, received Display Port mini-packets $MP_R$ may contain video data. The computing device 122 may also receive AUX Channel data. The MAC client 422a may de-encapsulate the Display Port mini-packets $MP_R$ from the Ethernet frames $EF_R$. The MAC client 422a may send the Display Port mini-packets $MP_R$ to the Display Port to Ethernet block 432. The Display Port to Ethernet block 432 may convert the Display Port mini-packets $MP_R$ to bits, which may be sent to the Display Port PHY-Lite layer 206. The Display Port PHY-Lite layer 206 may assemble the bits to reconstruct the Display Port mini-packets $MP_R$.

In the case where the Display Port mini-packets contain video data, the Display Port mini-packets may be sent to the Display Port connector 316 via the Video Main Lanes [3:0]. The Display Port mini-packets may be sent to the multimedia monitor 124 for display. In instances where the Ethernet frames may comprise AUX channel data, the AUX channel data may be sent to the GPU 306 via the AUX Channel. The GPU 306 may transfer the data to the MCH 304. The MCH 304 may in turn transfer the data retrieved from the received Display Port mini-packets to the CPU 302, which may process the data. The Display Port mini-packets $MP_R$ may be sent to the multimedia monitor 124 via the AUX Channel. In this regard, the multimedia monitor 124 may receive encryption keys, which may be utilized in connection with digital content protection, for example.

The time shim 424b may send Ethernet frames, $EF_R$, which do not contain encapsulated Display Port mini-packets or AUX channel data to the MAC client 422b. In this case, the MAC client 422b may determine whether the Ethernet frames $EF_R$ contain encapsulated digital audio data based on the EtherTypeSubType field within the Ethernet frames $EF_R$. The MAC client 422b may de-encapsulate the Ethernet payloads, $EP_R$, from the received Ethernet frames $EF_R$. In one aspect of the invention, the Ethernet payloads $EP_R$ may comprise digital audio data when the MAC client 422b determined that the Ethernet frames $EF_R$ contained encapsulated digital audio data. The MAC client 422b may send the Ethernet payloads $EP_R$ to the PCI to Ethernet block 434. Receipt of Ethernet frames $EF_R$, which comprise digital audio data, may cause the PCI to Ethernet block 434 to generate an interrupt signal. The interrupt signal may be received by the CPU 302, which may trigger an ISR. The ISR may select a device driver routine, which determines that the digital audio data contained in the Ethernet payloads $EF_R$ are to be sent to the speaker 130. The PCI to Ethernet block 434 may convert the Ethernet payloads $EP_R$ to signals, which may be sent to the ICH 310. In the case where the Ethernet payloads comprise digital audio data, the ICH 310 may send the digital audio data to the speaker 130 (FIG. 1).

In the case where the Ethernet payloads were not found to comprise digital audio data by the MAC client 422b, the Ethernet payloads may comprise data associated with non-multimedia applications, which may be processed by methods suitable for the data contained in the Ethernet payloads. The ICH 310 may convert the signals to bits, which may be sent to the CPU 302 via the MCH 304. The CPU 302 may process the data.

The ICH 310 may receive signals from the keyboard device 126 and/or mouse device 128. The signals may enable generation of keyboard/mouse data. The generated keyboard/mouse data may comprise response data, which may be generated in response to previously received digital video data and/or previously received digital audio data. In an exemplary embodiment of the invention, the signals received from the keyboard device 126 and/or mouse device 128 may be sent to the PCI to Ethernet block 434. The PCI to Ethernet block 434 may enable the generation of keyboard/mouse data based on the signals. The PCI to Ethernet block 434 may generate Ethernet payloads, EP, which comprise the keyboard/mouse data. The PCI to Ethernet block 434 may send the Ethernet payloads EP to the MAC client 422*b*. The MAC client 422*b* may encapsulate the Ethernet payloads within Ethernet frames. The Ethernet frames may comprise an EtherType-SubType, which indicates that the Ethernet frames encapsulate keyboard/mouse data. The MAC client 422*b* may send the Ethernet frames to the time stamp ship 424.

The time stamp shim 424*b* may time stamp the Ethernet frames and send the Ethernet frames to the 10G Ethernet MAC layer 426. The 10G Ethernet MAC layer 426 may generate bits, which may be sent to the 10GBASE-T PHY layer 436. The 10GBASE-T PHY layer 436 may transmit encoded bits to the network 112 via the Ethernet connector 318.

In an exemplary embodiment of the invention, the LAN subsystem 314 may comprise the Display Port to Ethernet block 432, the Display Port PHY layer 244, the MAC clients 422*a* and 422*b*, the time stamp shims 424*a* and 424*b*, the 10G Ethernet MAC block 426 and the PCI to Ethernet block 434. In another exemplary embodiment of the invention, the LAN subsystem 314 may comprise the Display Port to Ethernet block 432, the Display Port PHY layer 244, the MAC clients 422*a* and 422*b*, the time stamp shims 424*a* and 424*b*, the 10G Ethernet MAC block 426, the PCI to Ethernet block 434 and the 10GBASE-T PHY layer blocks 436.

Figure 6:
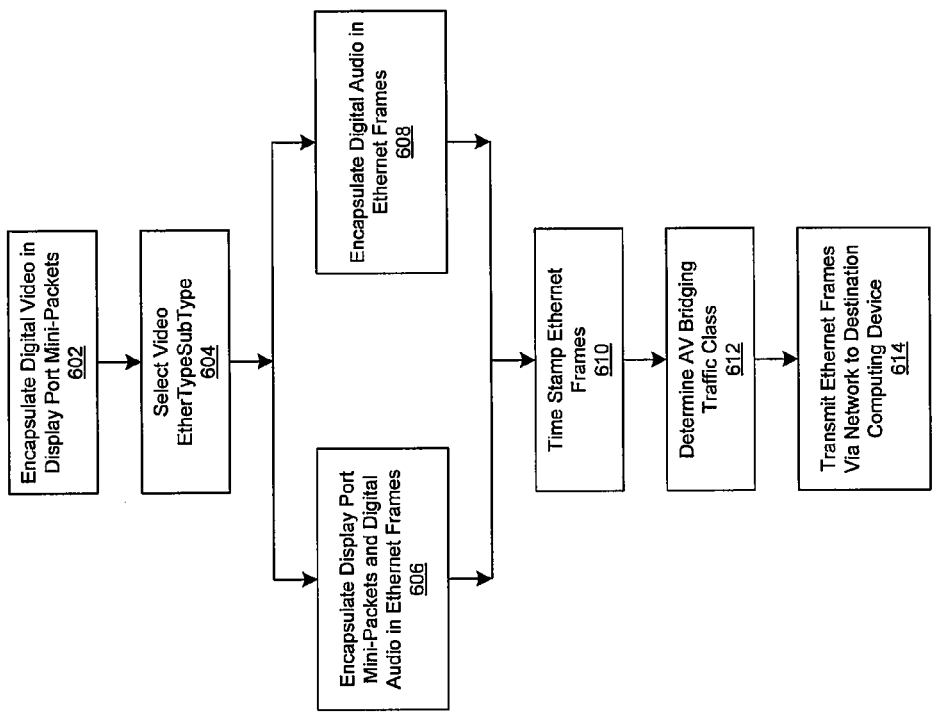
FIG. 6 is a flowchart illustrating exemplary steps for transporting encapsulated digital video data and digital audio data via an Ethernet network, in accordance with an embodiment of the invention.

FIG. 6 is a flowchart illustrating exemplary steps for transporting encapsulated digital video data and digital audio data via an Ethernet network, in accordance with an embodiment of the invention. Referring to FIG. 6, in step 602, the GPU 306 within the video server 104 may encapsulate digital video in Display Port mini-packets. In step 604, the EtherTypeSubType field may be set to a value indicating the associated Ethernet frames encapsulate video. In step 606, the Display Port mini-packets may be encapsulated in Ethernet frames by the MAC client 422*a* within the LAN subsystem 314. In step 608, digital audio, associated with the digital video, may be encapsulated within Ethernet frames by the MAC client 422*b* within the LAN subsystem 314. In step 610, the Ethernet frames generated in steps 606 and 608 may be time stamped by the time stamp shims 424*a* and 424*b*. In step 612, the 10G Ethernet MAC block 426 may determine an AV Bridging traffic class. In step 614, the LAN subsystem 314 may transmit the Ethernet frames via the network 112 to the computing device 122.

Figure 7:
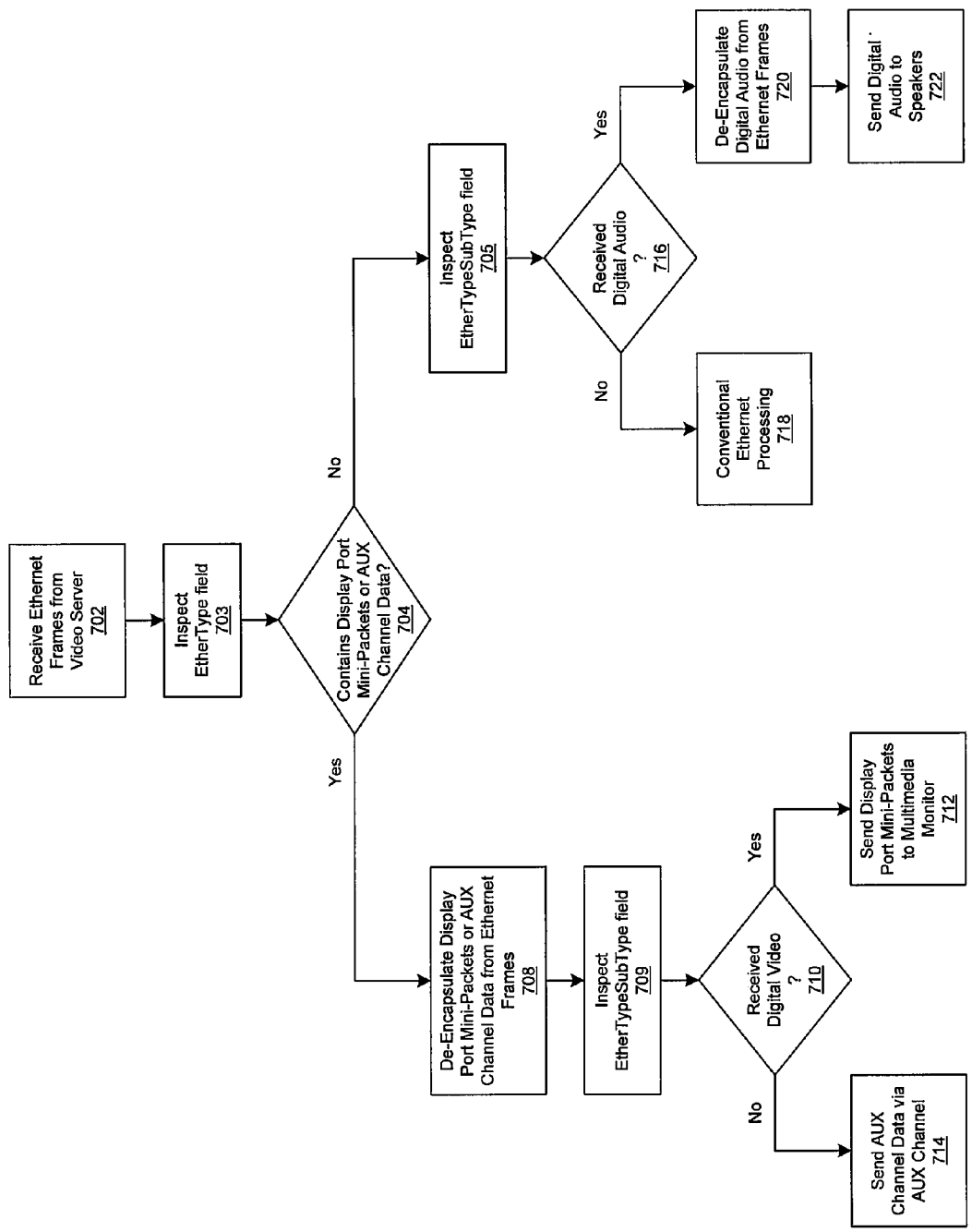
FIG. 7 is a flowchart illustrating exemplary steps for receiving encapsulated digital video data and digital audio data via an Ethernet network, in accordance with an embodiment of the invention.

FIG. 7 is a flowchart illustrating exemplary steps for receiving encapsulated digital video data and digital audio data via an Ethernet network, in accordance with an embodiment of the invention. The flowchart of FIG. 7 is exemplary as various embodiments of the invention may also be practiced with other digital video protocols, including HD video. Referring to FIG. 7, in step 702, the computing device 122 may receive Ethernet frames from the video server 104 via the network 112. Step 704 may determine whether the received Ethernet frames contain Display Port mini-packets or AUX channel data. When the received Ethernet frames contain Display Port mini-packets or AUX channel data, in step 708, the MAC client 422*a* may de-encapsulate the Display Port mini-packets or AUX channel data from the Ethernet frames. Step 710 may determine whether the Ethernet frames contain digital video. When the Ethernet frames contain digital video, in step 712, the Display Port mini-packets may be sent to the multimedia monitor 124. The multimedia monitor 124 may render the digital video on the monitor. When the Ethernet frames do not contain digital video, in step 714, the AUX channel data may be sent via an AUX channel to the GPU 306 and/or multimedia monitor 124. The AUX channel data sent to the GPU 306 may subsequently be sent to the CPU 302.

When the received Ethernet frames do not comprise Display Port mini-packets or AUX channel data, in step 716, the MAC client 422*b* may determine whether the Ethernet frames contain digital audio data. When the Ethernet frames do not comprise digital audio data, in step 718, the received Ethernet frames may be processed utilizing conventional Ethernet processing. When the Ethernet frames comprise digital audio data, in step 720, the digital audio data may be de-encapsulated from the Ethernet frames. In step 722, the digital audio data may be communicated to speakers 130, which may enable presentation of the audio data.

Figure 8:
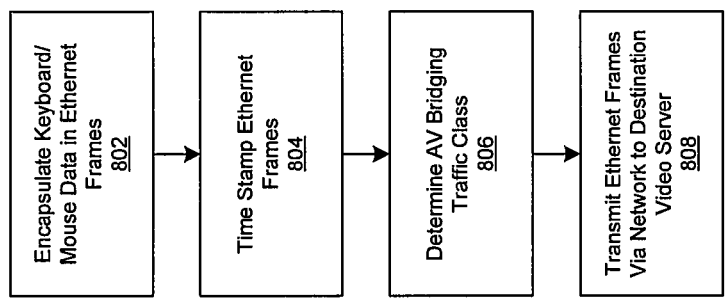
FIG. 8 is a flowchart illustrating exemplary steps for transporting keyboard and mouse data via an Ethernet network, in accordance with an embodiment of the invention.

FIG. 8 is a flowchart illustrating exemplary steps for transporting keyboard and mouse data via an Ethernet network, in accordance with an embodiment of the invention. Referring to FIG. 8, in step 802, the MAC client 422*b* may encapsulate keyboard/mouse data in Ethernet frames. The keyboard/mouse data may comprise keyboard data generated in response to signals from a keyboard 126, and/or mouse data generated in response to signals from a mouse 128. In step 804, the time stamp shim 424*b* may time stamp the Ethernet frames. In step 806, the 10G Ethernet MAC block 426 may determine an AV Bridging traffic class. In step 808, the LAN subsystem 314 may transmit the Ethernet frames via the network 112 to the video server 104.

Figure 9:
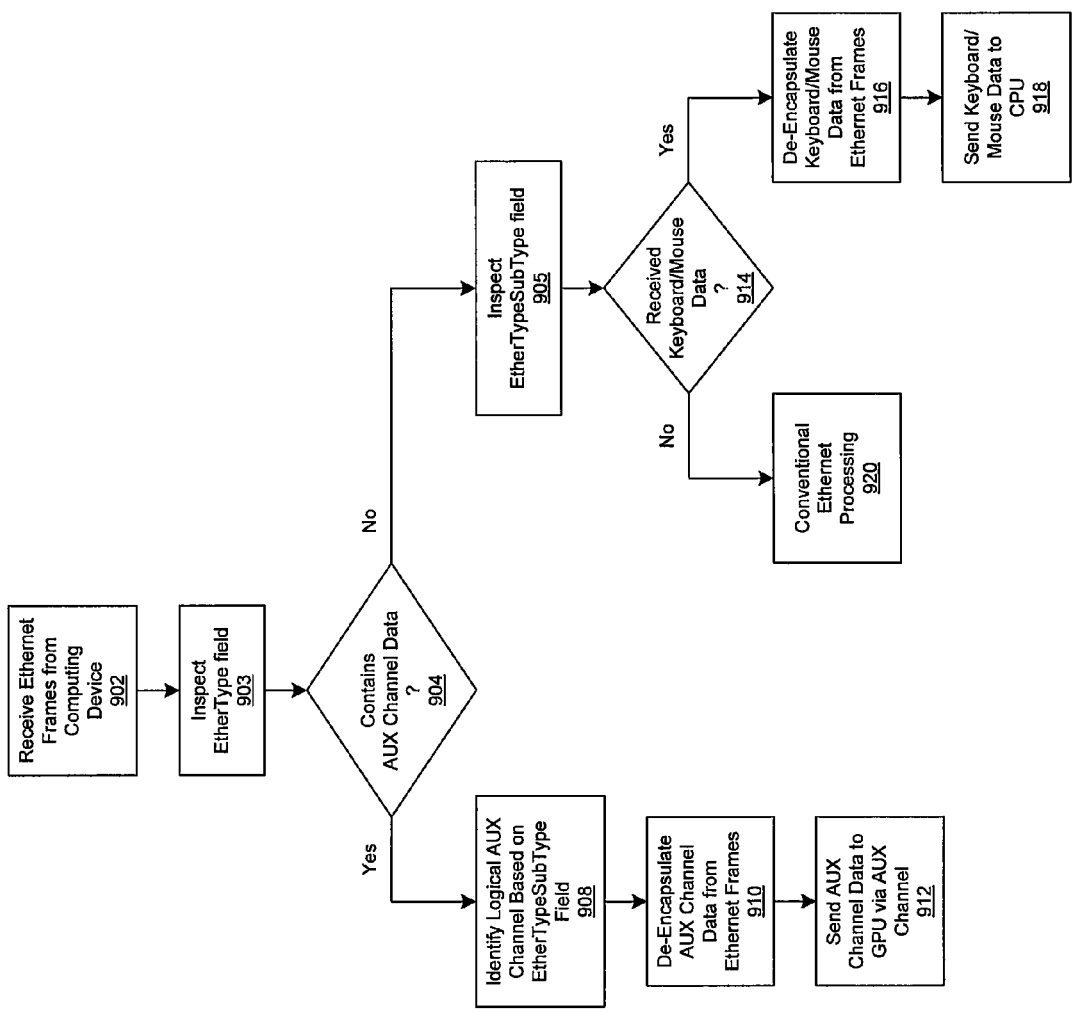
FIG. 9 is a flowchart illustrating exemplary steps for response data via an Ethernet network, in accordance with an embodiment of the invention.

FIG. 9 is a flowchart illustrating exemplary steps for receiving AUX channel information within encapsulated Display Port mini-packets via an Ethernet network, in accordance with an embodiment of the invention. The flowchart of FIG. 9 is exemplary as various embodiments of the invention may also be practiced with other digital video protocols, including HD video. Referring to FIG. 9, in step 902, the video server 104 may receive Ethernet frames from the computing device 122 via the network 112. Step 904 may determine whether the received Ethernet frames contain AUX channel data. When the received Ethernet frames contain AUX channel data, in step 908, the 10G Ethernet MAC block 426 may identify a logical AUX channel based on the EtherTypeSubType field. The logical AUX channel may identify an AUX channel associated with a multimedia monitor 124 attached to the computing device 122. In step 910, the received the MAC client 422*a* may de-encapsulate the AUX channel data from the Ethernet frames. In step 912, the AUX channel data may be sent to the GPU 306 via the AUX channel. The data may subsequently be sent to the CPU 302.

When step 904 determines that the received Ethernet frames may not comprise AUX channel data, in step 914, the MAC client 422*b* may determine whether the Ethernet frames contain keyboard/mouse data. When the Ethernet frames do not comprise keyboard/mouse data, in step 920, the received Ethernet frames may be processed utilizing conventional Ethernet processing. When the Ethernet frames comprise keyboard/mouse data, in step 916, the keyboard/mouse data may be de-encapsulated from the Ethernet frames. In step 918, the keyboard/mouse data may be sent to the CPU 302.

Various embodiments of the invention may be practiced in a wide range of applications involving the exchange of data, which may be conventionally transported across point-to-point links, and are not limited to transport the transport of Display Port traffic. For example, various embodiments of the invention may be practiced in connection with digital video (including HD video) applications. DVI is an example of an interface, which is utilized for the transport of digital video data via point-to-point links. In this regard, various embodiments of the invention may enable digital video data to be directly encapsulated within one or more Ethernet frames and transported across a network 112. The Ethernet frames may comprise an EtherType field designation, which indicates that the Ethernet frames are being utilized to encapsulate the digital video data. The Ethernet frames may also comprise a traffic class identifier, which may enable the network 112 to provide services for the transport of the Ethernet frames in accordance with AV Bridging specifications.

The high definition multimedia interface (HDMI) standard defines an example of an interface and protocol, which may be utilized for the transport of digital video data. In this regard, various embodiments of the invention may enable uncompressed HDMI video data to be encapsulated within one or more Ethernet frames and transported across a network 112. The Ethernet frames may comprise an EtherType field designation, which indicates that the Ethernet frames are being utilized to encapsulate uncompressed HDMI video data.

In various embodiments of the invention, the video data may be compressed and/or encrypted, whether the video data is sent as native video data or is encapsulated, such as in a Display Port mini-packet, for example.

Various embodiments of the invention may not be limited to Ethernet networks but may also be practiced with other network technologies, such as token ring, fibre distributed data interface (FDDI) and Asynchronous Transfer Mode (ATM) networks. Various embodiments of the invention may not be limited to LANs but may also be practiced in wider area networks, such as virtual LANs (VLAN) and metropolitan area networks (MAN), for example. Various embodiments of the invention may also be practiced in wireless networks, for example wireless LANs, such as specified in IEEE 802.11 standards, for example. For example, various embodiments of the invention may be practiced with different network technologies by configuring the LAN subsystem 314 (FIG. 3) based on code and/or data contained within the memory 320.

Aspects of a system for keyboard, sound and mouse (KSM) over LAN A/V bridging and A/V bridging extensions for graphics thin client applications may include an I/O controller within an LAN subsystem, which enables generation of response data based on input signals from a keyboard device and/or a mouse device that is coupled via a PCI interface to a computing device. The generated response data may be encapsulated within an encapsulating PDU. The encapsulating PDU may comprise an Ethernet frame and/or and IP packet. The encapsulating PDU may be transmitted via a network based on a traffic class designation. The traffic class designation may enable the transmission of the generated response data via the network based on specified latency target values. A time stamp value may be generated for the encapsulating PDU. The encapsulating PDU may include at least one data type identifier, which indicates that the encapsulating PDU contains the generated response data. The data type identifier(s) may comprise an EtherType and an EtherTypeSubType.

Aspects of a method for keyboard, sound and mouse (KSM) over LAN A/V bridging and A/V bridging extensions for graphics thin client applications may include extracting digital video data encapsulated within an encapsulating PDU received at a computing device 122 via a network 112. Digital audio data encapsulated within a subsequent encapsulating PDU received at the computing device 122 via the network 112 may also be extracted. The digital video data may be transmitted to a multimedia monitor 124 coupled to the computing device 122 via a Display Port connector 316, which enables rendering of the digital video data on the multimedia monitor 124. The digital audio data may be transmitted to a speaker 130 coupled via a PCI interface to the computing device, which enables presentation of the digital audio data on the speaker 130. The PCI to Ethernet block 434 may enable generation of an interrupt signal, which enables the digital audio data to be transmitted to the speaker 130. The encapsulating PDU may be an Ethernet frame and/or an IP packet.

The encapsulating PDU and subsequent encapsulating PDU may be delivered based on a traffic class designation. A latency associated with the delivery of the encapsulating PDU and subsequent encapsulating PDU may be determined based on the traffic class designation. The encapsulating PDU and subsequent encapsulating PDU may each comprise a corresponding time stamp value. The encapsulating PDU and subsequent encapsulating PDU maybe correlated based on the corresponding time stamp values. The digital video data may be transmitted to the multimedia monitor 124 and of the digital audio data may be transmitted to the speaker 130 based on the correlating of PDUs. The LAN subsystem 314 may determine whether the encapsulating PDU comprises the digital video data and whether the subsequent encapsulating PDU comprises the digital audio data based on at least one data type identifier. The data type identifiers may comprise an EtherType and an EtherTypeSubType.

Another embodiment of the invention may provide a machine-readable storage, having stored thereon, a computer program having at least one code section executable by a machine, thereby causing the machine to perform the steps as described herein for keyboard, sound and mouse (KSM) over LAN A/V bridging and A/V bridging extensions for graphics thin client applications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:

receiving, by a computing device from a video server, first Ethernet frames that have DisplayPort mini-packets encapsulated within said first Ethernet frames;

forwarding de-encapsulated DisplayPort mini-packets to a multimedia monitor via a DisplayPort interface connector for display of digital video;

digitizing signals received from a keyboard device and/or a mouse device coupled to the computing device in response to the display of digital video;

encapsulating at least said digitized signals within one or more second Ethernet frames, wherein the one or more second Ethernet frames comprises a type identifier that uniquely indicates that said encapsulating one or more second Ethernet frames comprises signals originating from a keyboard device and/or a mouse device; and transmitting said one or more second Ethernet frames via a network based on a traffic class designation.

2. The method according to claim 1, wherein said traffic class designation enables transmission of said digitized signals via said network based on specified latency target values.

3. The method according to claim 1, comprising generating a time stamp value for said one or more second Ethernet frames.

4. The method according to claim 1, wherein said type identifier is an EtherTypeSubType that indicates that said one or more second Ethernet frames comprises signals originating from a keyboard device and/or a mouse device.

5. A computing device, comprising:

one or more circuits that enable digitization of signals from a keyboard device and/or a mouse device coupled to the computing device, the one or more circuits being operable to;

receive, by the computing device from a video server, first Ethernet frames that have DisplayPort mini-packets encapsulated within said first Ethernet frames;

forward de-encapsulated DisplayPort mini-packets to a multimedia monitor via a DisplayPort interface connector for display of digital video;

digitize signals received from the keyboard device and/or the mouse device coupled to the computing device in response to the display of digital video;

encapsulate at least said digitized signals within an one or more second Ethernet frames, wherein said one or more second Ethernet frames comprises a type identifier that uniquely indicates that said one or more second Ethernet frames comprises signals originating from the keyboard device and/or the mouse device; and transmit said one or more second Ethernet frames via a network based on a traffic class designation.

6. The computing device according to claim 5, wherein said traffic class designation enables transmission of said one or more second Ethernet frames via said network based on specified latency target values.

7. The computing device according to claim 5, wherein said one or more circuits further enable generation of a time stamp value for said one or more second Ethernet frames.

8. The computing device according to claim 5, wherein said type identifier is an EtherTypeSubType that indicates that said one or more second Ethernet frames comprises signals originating from a keyboard device and/or a mouse device.

* * * * *